United States Patent [19]
Ogasawara et al.

[11] Patent Number: 6,151,154
[45] Date of Patent: Nov. 21, 2000

[54] OPTICAL PICKUP, ABERRATION CORRECTION UNIT AND ASTIGMATISM MEASUREMENT METHOD

[75] Inventors: Masakazu Ogasawara; Yoshitsugu Araki; Sakashi Ootaki; Junichi Furukawa; Kiyoshi Tateishi, all of Saitama, Japan

[73] Assignee: Pioneer Electronic Corporation, Tokyo, Japan

[21] Appl. No.: 09/265,892

[22] Filed: Mar. 11, 1999

[30] Foreign Application Priority Data

Mar. 12, 1998 [JP] Japan .................................. 10-080305
Jul. 17, 1998 [JP] Japan .................................. 10-203952

[51] Int. Cl.[7] ....................................................... G02F 1/01
[52] U.S. Cl. .............................. 359/279; 359/9; 359/237; 359/295; 359/319; 359/637; 349/57; 349/200; 369/44.38; 369/112
[58] Field of Search ................................... 359/237, 254, 359/276, 279, 295, 315, 319, 637, 9, 248; 349/17, 25, 57, 200; 369/112, 44.38

[56] References Cited

U.S. PATENT DOCUMENTS

| | | | |
|---|---|---|---|
| 4,243,300 | 1/1981 | Richards et al. | 359/279 |
| 5,426,521 | 6/1995 | Chen et al. | 359/9 |
| 5,751,471 | 5/1998 | Chen et al. | 359/319 |
| 5,815,233 | 9/1998 | Morokawa et al. | 349/200 |
| 5,907,427 | 5/1999 | Scalora et al. | 359/248 |
| 5,914,802 | 6/1999 | Stappaerts et al. | 359/279 |
| 5,973,817 | 10/1999 | Robinson et al. | 359/279 |
| 5,995,685 | 11/1999 | Seino | 359/279 |

FOREIGN PATENT DOCUMENTS 9-128785  5/1997  Japan .

*Primary Examiner*—Loha Ben
*Attorney, Agent, or Firm*—Morgan, Lewis & Bockius LLP

[57] ABSTRACT

An optical pickup includes: a light source, an object lens, and an aberration correction unit for correcting aberration by giving a phase difference to a light beam. The aberration correction unit corrects astigmatism caused by an optical system of the optical pickup.

28 Claims, 17 Drawing Sheets

FIG. 2A
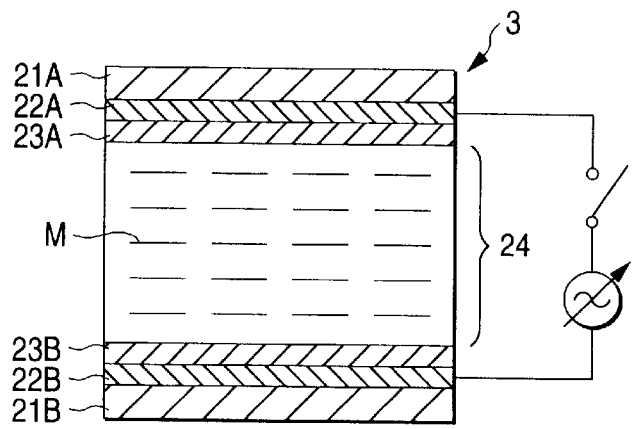
FIG. 2B
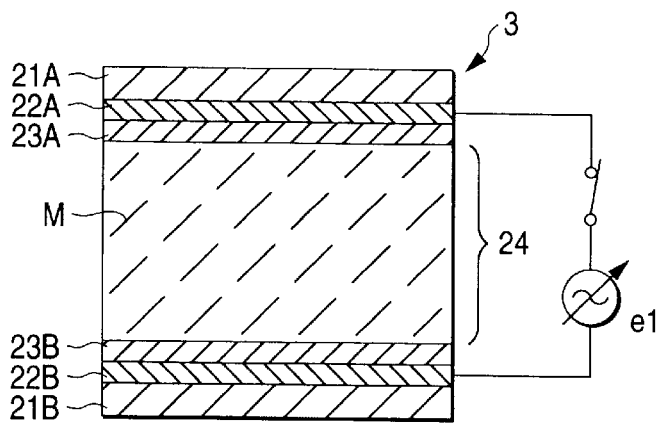
FIG. 2C
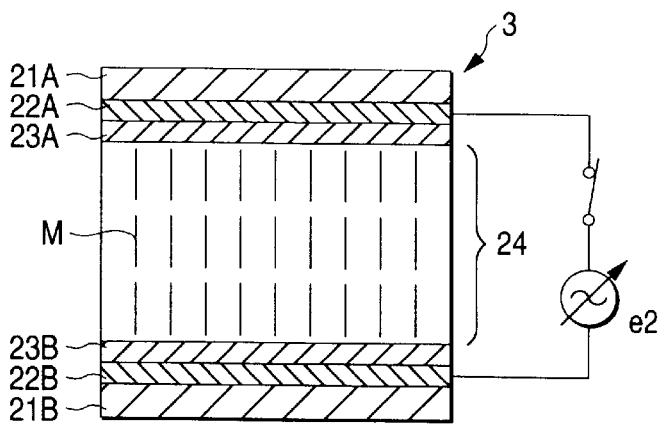
FIG. 3    LIQUID CRYSTAL MOLECULE M
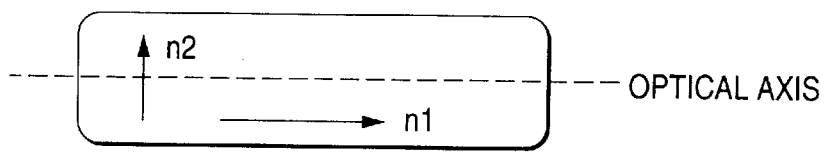

FIG. 13

| (PATTERN ELECTRODE →) | 30 | 31  35 | 32  36 | 33  37 | 34  38 |
|---|---|---|---|---|---|
| DRIVE PATTERN A | Vc | Vb | Va | Va | Vb |
| DRIVE PATTERN B | Vc | Vb | Vc | Va | Vc |
| DRIVE PATTERN C | Vc | Vb | Vb | Va | Va |
| DRIVE PATTERN D | Vc | Vc | Vb | Vc | Va |
| DRIVE PATTERN E | Vc | Va | Vb | Vb | Va |
| DRIVE PATTERN F | Vc | Va | Vc | Vb | Vc |
| DRIVE PATTERN G | Vc | Va | Va | Vb | Vb |
| DRIVE PATTERN H | Vc | Vc | Va | Vc | Vb |
| DRIVE PATTERN I | Vc | Vc | Vc | Vc | Vc |

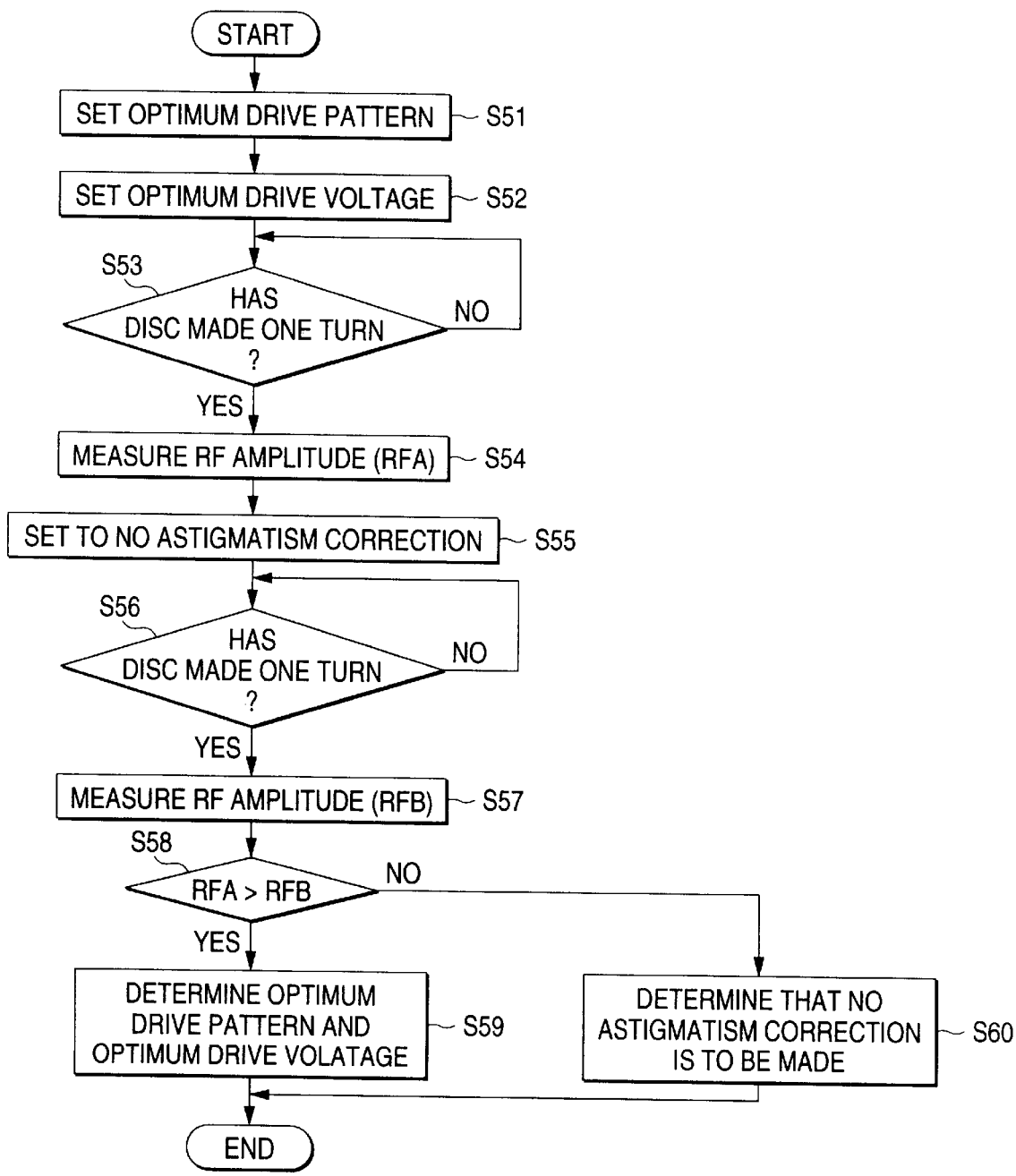

OPTICAL PICKUP, ABERRATION CORRECTION UNIT AND ASTIGMATISM MEASUREMENT METHOD

BACKGROUND OF THE INVENTION

1. Field of the Invention

The present invention relates to an aberration correction unit for correcting astigmatism caused by an optical system of an optical pickup in an information playback system or an information recording system for playing back or recording record information by irradiating an information recording medium such as a CD or a DVD with a light beam.

2. Description of the Related Art

A DVD (digital video disc or digital versatile disc) is becoming pervasive as an optical disc on which large-capacity digital information can be recorded. The DVD is an optical disc having the same diameter (12 cm) as a CD (compact disc) and is capable of recording digital information of moving pictures, computer information, etc., at a recording density of about eight times or more that of the CD. A DVD playback machine for playing back DVDs can also playback CDs. Different types of optical discs including the CD and DVD are played back with one pickup in the DVD playback machine.

As a method of correcting comatic aberration caused by the tilt angle of each optical disc and spherical aberration caused by the substrate thickness difference between play-backed optical discs to play back the optical discs, JP-A-9-128785 discloses a method of placing liquid crystal elements in an optical path of an optical pickup for correcting the comatic aberration and the spherical aberration. In this method, voltage is applied to the liquid crystal, thereby changing the refractive index of the liquid crystal for giving an appropriate phase difference to the luminous flux passing through the liquid crystal. With the optical pickup thus structured, the effects of the comatic aberration caused by the tilt angle of each optical disc and the spherical aberration caused by the substrate thickness difference between discs are canceled.

However, wave front aberration occurring when an optical disc is played back is caused not only by the comatic aberration or spherical aberration, but also by astigmatism. The astigmatism occurs due to accuracy or an assembly error of optical parts, shift or inclination of an optical axis, or the like. Moreover, even optical pickups each having the same optical system differ in astigmatism direction or aberration size. To decrease the astigmatism, the accuracy of the optical parts used with the optical pickup needs to be improved or after assembly, a precise adjustment needs to be made, resulting in an increase in costs.

SUMMARY OF THE INVENTION

It is therefore an object of the invention to provide an optical pickup capable of correcting astigmatism according to a simple configuration.

To achieve the above object, the present invention is characterized by the following features.

(1) An optical pickup includes:
   a light source for emitting a light beam;
   an object lens for processing the light beam from the light source; and
   an aberration correction unit for correcting aberration by giving a phase difference to the light beam, the aberration correction unit correcting astigmatism caused by an optical system of the optical pickup.

(2) The optical pickup according to (1), wherein the aberration correction unit has an electrode for applying voltage and a refractive index variable layer whose refractive index with respect to the light beam changes in response to change in the voltage, and a phase difference for canceling the astigmatism is given to the light beam by controlling the voltage.

(3) The optical pickup according to (2), wherein the electrode is divided into parts as a pattern corresponding to a wave front aberration distribution of the astigmatism.

(4) The optical pickup according to (3), wherein the wave front aberration distribution is based on a pupil plane of the object lens.

(5) The optical pickup according to (3), wherein voltage is applied to the division electrodes so as to give the phase difference for canceling the astigmatism to the light beam.

(6) The optical pickup according to (2), wherein the refractive index variable layer is a liquid crystal layer.

According to the above features (1) to (6) of the invention, a phase difference is given to a passing-through luminous flux, thereby correcting astigmatism, so that the astigmatism can be corrected according to the simple configuration and a good play-back characteristic can be provided. Since the astigmatism can be reduced without using optical parts of high accuracy, a decrease in costs of the optical pickup can be accomplished.

(7) An aberration correction unit for giving a phase difference to a light beam emitted from a light source and applied through an object lens to a recording medium, thereby correcting aberration, the aberration correction unit including:
   an electrode including a plurality of division electrodes corresponding to a plurality of division areas through which the light beam passes and which are divided in accordance with a distribution of astigmatism caused by an optical system,
   wherein voltage is applied to the division electrode provided in each division area in response to directionality of the astigmatism so that a phase difference is given to the light beam passing through each division area in response to change in the voltage for correcting the astigmatism.

According to the feature (7) of the invention, the light beam emitted from the light source arrives at the passage area divided into a plurality of parts in the aberration correction unit and is given a phase difference from each division area. At this time, voltage for correcting the astigmatism caused by the optical system is applied to the electrode in each division area and the light beam after correction is applied through the object lens to the recording medium. Thus, if an optical pickup contains astigmatism in various directions, the division areas corresponding to the directions are provided and the applied voltage to each electrode can be easily varied, so that the astigmatism of the optical pickup can be well corrected without the need for requiring extremely high accuracy for optical parts and without adjustment, etc., after assembly.

(8) The aberration correction unit according to (7), wherein the astigmatism is corrected by giving the phase difference to the light beam through a liquid crystal layer having a refractive index varied in response to the voltage.

According to the feature (8) of the invention, the applied voltage to each division area of the liquid crystal layer is varied for changing the refractive index, whereby a phase difference is given to the light beam passing through the area. Thus, a liquid crystal panel is placed in the optical system of the optical pickup, whereby astigmatism in various directions can be easily corrected, and automatic adjustment of the astigmatism of the optical pickup can be made according to the simple configuration.

(9) The aberration correction unit according to (8), further includes:

a detection unit for detecting a direction and size of the astigmatism, wherein the voltage is set based on the detection result of the detection unit.

According to the feature (9) of the invention, the direction and size of the astigmatism caused by the optical system are previously detected and the voltage applied to each electrode is set based on the detection result, so that special adjustment becomes unnecessary and an astigmatism correction can be made easily.

(10) The aberration correction unit according to (9), wherein the detection unit detects the direction and size of the astigmatism at the last stage of manufacturing or at the power on time of the product.

According to the feature (10) of the invention, the direction and size of the astigmatism caused by the optical system are detected at the last stage of manufacturing or at the product power on time. Thus, an appropriate automatic adjustment fitted to the astigmatism fluctuation factor in the optical system is made and later an astigmatism correction can be made easily.

(11) The aberration correction unit according to (8), wherein the voltages applied to the division electrodes can be set separately for each division area.

According to the feature (11) of the invention, the applied voltages are set separately for the division areas and an astigmatism correction is made, so that correction pattern flexibility can be made great and a correction can be made corresponding to various astigmatism distributions.

(12) The aberration correction unit according to (8), wherein the division areas are divided into a center portion and a peripheral portion, the outer peripheral portion is furthermore substantially symmetrically divided with respect to the center portion.

According to the feature (12) of the invention, the light beam passage area passes through the division area of the center portion in the vicinity of the optical axis and passes through the division areas of the outer peripheral portion so as to surround the center division area. Thus, a correction fitted to the astigmatism characteristic that wave front aberration less changes at the center and changes with a direction in the outer periphery can be made; an astigmatism correction is made easily under simple control.

(13) The aberration correction unit according to (12), wherein voltages for giving phase differences to the light beam are applied to a pair of division electrodes of the outer peripheral portion symmetrical with respect to the center corresponding to the astigmatism direction and a pair of division electrodes of the outer peripheral portion orthogonal thereto, and the voltage applied to the pair of division electrodes has the phase differences of opposite polarities with respect to the voltage applied to the pair of orthogonal division electrodes.

According to the feature (13) of the invention, the division areas of the outer peripheral portion are made symmetrical with respect to the center and an opposite characteristic is given in the orthogonal direction. Thus, the drive pattern can be rotated in response to the astigmatism direction for making an astigmatism correction easily and the number of division areas of the outer peripheral portion can be changed for adjusting correction accuracy easily.

(14) The aberration correction unit according to (12), wherein if the astigmatism direction is positioned in vicinity of a boundary between the division areas of the outer peripheral portion, voltages for giving phase differences to the light beam are applied to two pairs of division electrodes arranged symmetrical with respect to the center on both sides of the boundary and two pairs of division electrodes orthogonal thereto, and the voltage applied to the two pairs of division electrodes has the phase differences of opposite polarities with respect to the voltage applied to the two pairs of orthogonal division electrodes.

According to the feature (14) of the invention, the adjacent division areas may be controlled so as to become the same phase difference and be made the same shape as the feature (13). Thus, by combining with the drive method in the feature (13), the case where the astigmatism direction overlaps the division area or is on the boundary between the division areas can be handled appropriately and the number of division areas can be substantially doubled for making an astigmatism correction.

(15) The aberration correction unit according to (12), wherein the correction degree of the astigmatism is determined at a predetermined timing for MXN setting states provided by combining M drive patterns of the division areas corresponding to the astigmatism direction and N steps of voltages applied to the electrodes, and an optimum setting state is selected for correcting the astigmatism.

According to the feature (15) of the invention, to adjust astigmatism in the manufacturing process or at the product start time, RF amplitude, jitter, etc., for example, is measured for all states combining M drive patterns and N steps of voltages that can be set, whereby whether or not the astigmatism correction is proper is checked and the optimum drive pattern and voltage combination is set. Thus, fine adjustment can be made and if the number of combinations is increased, astigmatism correction accuracy can be improved easily.

(16) The aberration correction unit according to (12), wherein the correction degree of the astigmatism is determined on preset voltage at a predetermined timing for M drive patterns of the division areas corresponding to the astigmatism direction and an optimum drive pattern is selected, then the correction degree of the astigmatism is furthermore determined for N steps of voltages applied to the electrodes and an optimum voltage is selected for correcting the astigmatism.

According to the feature (16) of the invention, measurement for all combinations as in the feature (15) is not executed and first an optimum one is selected from among the M drive patterns, then an optimum voltage is selected from among N steps of voltages for making adjustment. Thus, adjustment for correcting astigmatism is complete in a short time; even if frequent adjustment is made, there is no harm.

(17) The aberration correction unit according to (15) or (16), wherein the astigmatism in the optimum setting state for the astigmatism correction is compared with that in a state in which the astigmatism correction is not made and wherein the astigmatism correction is made only if better astigmatism is provided in the optimum setting state.

According to the feature (17) of the invention, the astigmatism correction is made only if better astigmatism than that when no astigmatism correction is made is provided in the optimum setting state determined as the result of the adjustment as described above. Thus, a situation in which an unnecessary correction is made for an optical pickup in an ideal state with no astigmatism is avoided.

(18) The aberration correction unit according to (15) or (16), wherein the correction degree of the astigmatism is determined in synchronization with a rotation period of the turned recording medium.

According to the feature (18) of the invention, the above-described adjustment is made in synchronization with the rotation period of a recording medium such as an optical disc. Thus, if there is side swing occurring with rotation because of the effect of tilt, etc., it does not cause imprecise measurement to be executed and a more precise astigmatism correction is made.

(19) An astigmatism detection method, for an aberration correction unit in which an area through which a light beam emitted from a light source and applied through an object lens to a recording medium passes is divided into a plurality of parts corresponding to a distribution of astigmatism caused by an optical system and an electrode to which a voltage is applied is provided in each division area, includes the steps of:

adjusting a drive pattern of the division areas and the voltage applied to each electrode; and detecting a direction and size of the astigmatism.

According to the feature (19) of the invention, when voltages are applied to the electrodes provided in the division areas into which the light beam passage area is divided corresponding to an astigmatism distribution, the voltage drive pattern and the voltages are adjusted and the astigmatism direction and size are detected. Thus, astigmatism having arbitrary directionality can be corrected without making a special adjustment to the optical pickup.

(20) An optical pickup includes:

an aberration correction unit according to (7); and an optical system being placed so that the light beam emitted from the light source and applied to a recording medium passes through the aberration correction unit.

According to the feature (20) of the invention, in the optical system of the optical pickup, the above-described aberration correction unit is placed so as to allow the light beam to pass through, so that the astigmatism caused by the optical system can be easily and well corrected.

BRIEF DESCRIPTION OF THE DRAWINGS

In the accompanying drawings:

FIGS. 2A to 2C are longitudinal cross-sectional views of a liquid crystal panel in the first and second embodiments of the invention;

FIG. 3 is a schematic representation of a liquid crystal molecule;

FIG. 13 is a table to show selection switch drive patterns in the second embodiment of the invention;

FIG. 20 is a flowchart to show processing for comparing the optimum drive method with a case where no astigmatism correction is made in the liquid crystal panel adjustment method executed in synchronization with rotation of an optical disc in the second embodiment of the invention.

DETAILED DESCRIPTION OF THE PREFERRED EMBODIMENTS

A description will be given of preferred embodiments of the invention with reference to the accompanying drawings. The embodiments are provided by applying the invention to an optical pickup of an information playback system for reading record information recorded on an optical disc such as a DVD.

Figure 1:
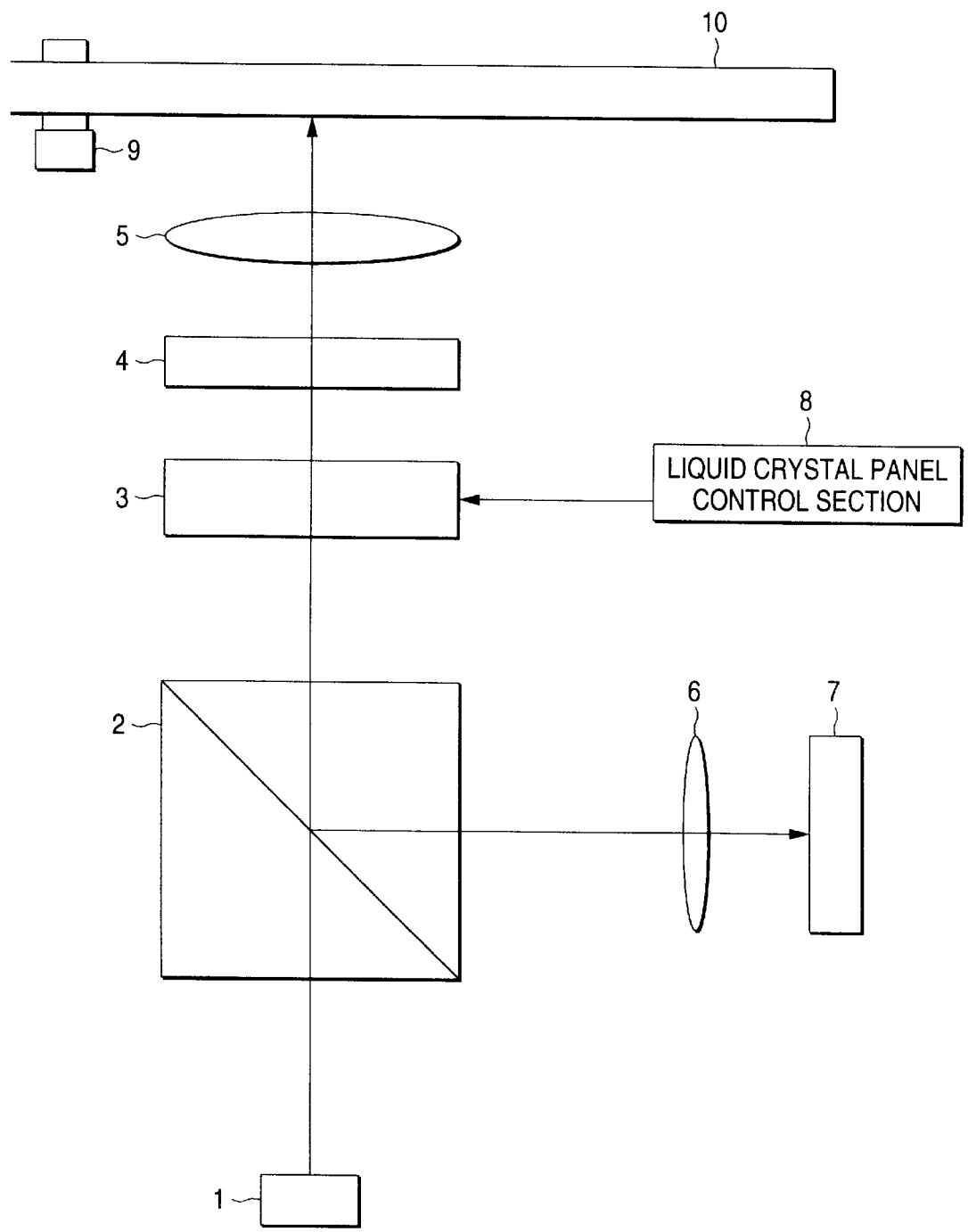
FIG. 1 is a schematic block diagram of an optical pickup in first and second embodiments of the invention.

FIG. 1 is a block diagram showing the general configuration of an optical pickup according to the embodiment of the invention. The optical pickup shown in FIG. 1 includes: a laser light source 1, a polarized light beam splitter 2, a liquid crystal panel 3 as astigmatism correction means, a quarter wavelength plate 4, an object lens 5, a condensing lens 6, a light receiver 7, and a liquid crystal panel control section 8. An optical disc 10 irradiated with a light beam by the optical pickup is rotated by a spindle motor 9.

In FIG. 1, a light beam emitted from the laser light source 1 passes through the polarized light beam splitter 2, then is incident on the liquid crystal panel 3. When the light beam passes through the liquid crystal panel 3, astigmatism is corrected as described later, then passes through the quarter wavelength plate 4 and is condensed on the information record side of the optical disc 10 through the object lens 5.

At this time, the optical disc 10 is rotated at the appropriate number of revolutions by the spindle motor 9 so that record tracks of the information record side hold a constant linear velocity relative to the light beam. A rotation pulse is output to a CPU (central processing unit) (not shown) in synchronization with rotation of the optical disc 10.

On the other hand, the light beam reflected on the information record side of the optical disc 10 again passes through the object lens 5 and the quarter wavelength plate 4 and is diverted by the polarized light beam splitter 2, then is condensed through the condensing lens 6 on the light receiver 7, which then converts a light signal into an electric signal and outputs the electric signal. The quarter wavelength plate 4 is placed so as to cross at an angle of 45 degrees the polarization plane of the light beam converted into a linear wave by the polarized light beam splitter 2.

FIGS. 2A to 2C show the cross-sectional structures of the liquid crystal panel 3 according to the embodiment. As shown here, liquid crystal 24 such as nematic crystal including liquid crystal molecules M is interposed between orientation films 23A and 23B for giving predetermined molecular orientation to liquid crystal 24. In addition, transparent electrodes 22A and 22B made of ITO, etc. are evaporated on the outsides of the orientation films 23A and 23B. The transparent electrodes 22A and 22B are pattern electrodes corresponding to a wave front aberration distribution mainly caused by astigmatism as described later, and are constructed by a plurality-of division electrodes. Further, glass substrates 21A and 21B as protective layers on the outermost portions. Moreover, the liquid crystal panel 3 has a region wider than a beam diameter of the light beam.

The liquid crystal 24 used with the liquid crystal panel has so-called double refraction wherein the refractive index varies depending on the liquid crystal molecule direction in such a manner that the refractive index in the optical axial direction of the liquid crystal molecules M is n1 and that the refractive index in a direction perpendicular to the optical axial direction is n2 as shown in FIG. 3.

The voltage applied between the transparent electrodes 22A and 22B is changed, whereby the orientation of the liquid crystal molecules M can be changed as desired from the horizontal direction to the vertical direction, as shown in FIGS. 2A to 2C. The applied voltage to the transparent electrode 22A, 22B is set by the liquid crystal panel control section 8, and the voltage applied to each division area of the transparent electrodes 22A, 22B is adjusted, thereby giving a phase difference varying from one area to another formed by each division electrode.

Next, the principle of correction of astigmatism caused by the optical system in the optical pickup according to the invention will be discussed. If the polar coordinates on the pupil plane of the object lens 5 are represented as $(r, \phi)$, wave front aberration $W(r, \phi)$ on the pupil plane of the object lens 5 is represented by the following expression:
[Expression 1]

$$W(r,\phi)=W_{11}r\cos\phi+W_{20}r^2+W_{22}r^2\cos^2\phi+W_{31}r^3\cos\phi+W_{33}r^3\cos^3\phi+W_{40}r^4 \quad (1)$$

where $W_{11}r\cos\phi$ is caused by image point move, $W_{31}r^3\cos\phi$ represents comatic aberration caused mainly by the tilt angle of the optical disc, etc., $W_{40}r^4$ represents spherical aberration caused mainly by the substrate thickness difference between optical discs, etc., $W_{20}r^2$ represents aberration caused by defocus, and $W_{22}r^2\cos^2\phi$ represents astigmatism caused mainly by the optical system in the optical pickup. $W_{ij}$ is aberration coefficient.

An object of the invention is to cancel astigmatism. Thus, for simplicity, it is considered that the comatic aberration and the spherical aberration are 0 and only the astigmatism exists in [Expression 1]. In this case, the wave front aberration on the pupil plane of the object lens 5 is represented as follows:
[Expression 2]

$$W_{AS}(r,\phi)=W_{20}r^2+W_{22}r^2\cos^2\phi \quad (2).$$

Assuming that the standard deviation of the wave front aberration $W(r, \phi)$ on the pupil plane of the object lens 5 is $W_{rms}$, $W_{rms}$ is represented by the following expression:
[Expression 3]

$$W_{rms}=\sqrt{\int\int(W(r,\phi)-W_0)^2 r\,dr\,d\phi/\pi} \quad (3)$$

where $W_0$ is an average value of $W(r, \phi)$

The $W_{rms}$ is used for evaluation of the wave front aberration. If $W_{rms}$ is lessened, the effect of the wave front aberration is decreased and good playback can be executed.

If the wave front aberration which occurs is only astigmatism, [Expression 3] is represented by the following expression:
[Expression 4]

$$W_{rms}=\sqrt{\int\int(W_{AS(r,\phi)}-W_0)^2 r\,dr\,d\phi/\pi} \quad (4)$$

where $W_{20}r^2$ in $W_{AS}(r, \phi)$ becomes a value minimizing $W_{rms}$. With the actual optical pickup, $W_{rms}$ becomes the minimum by making focus offset adjustment.

Figure 4A:
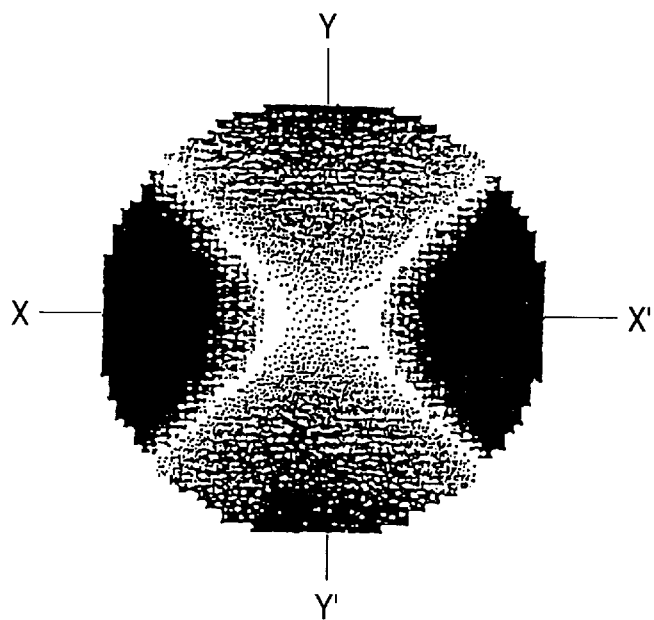
FIGS. 4A to 4C are drawings to show a wave front aberration distribution of an object lens on a pupil plane in the first and second embodiments of the invention.
Figure 4B:
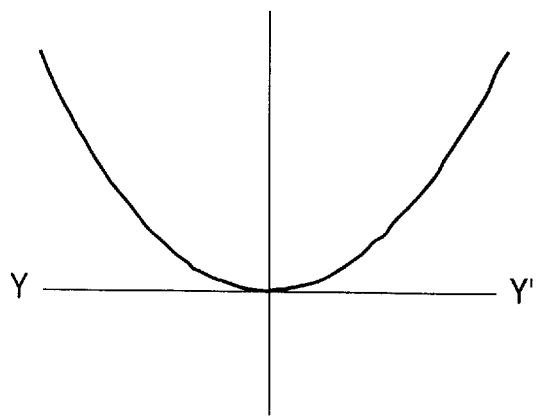
Figure 4C:
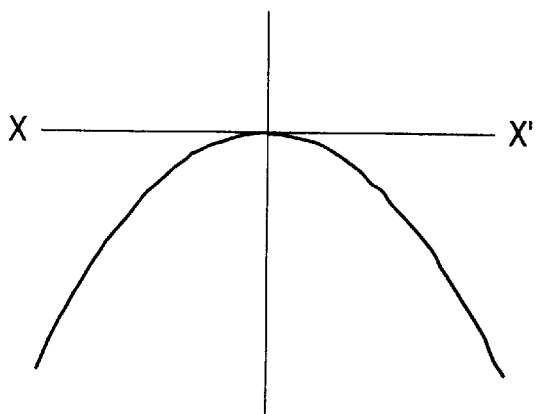

FIGS. 4A to 4C show a wave front aberration distribution on the pupil plane of the object lens 5 calculated based on [Expression 4]. FIG. 4A shows a wave front aberration distribution caused by astigmatism on the pupil plane of the object lens 5 calculated based on [Expression 4]; the dark portions denote areas with large astigmatism.

FIG. 4B is a sectional view of the wave front aberration distribution caused by astigmatism taken on line Y-Y' in FIG. 4A. As seen in FIG. 4B, the wave front aberration distribution is small at the center of the pupil plane of the object lens 5 in the Y-Y' direction and the wave front aberration grows in the positive direction toward the peripheral portions. When the wave front aberration at the center of the pupil plane of the object lens 5 is 0, a wave front aberration of +0.15 λ occurs in the peripheral portion Y, Y'.

FIG. 4C is a sectional view of the wave front aberration distribution caused by astigmatism taken on line X-X' in FIG. 4A. As seen in FIG. 4C, the wave front aberration distribution is small at the center of the pupil plane of the object lens 5 in the X-X' direction and the wave front aberration grows in the negative direction toward the peripheral portions. When the wave front aberration at the center of the pupil plane of the object lens 5 is 0, a wave front aberration of −0.15 λ occurs in the peripheral portion X, X'.

As shown in FIGS. 4A to 4C, the wave front aberration distribution mainly caused by astigmatism on the pupil plane of the object lens 5 is shaped like a horse saddle and is symmetric with respect to the X-X' axis and the Y-Y' axis.

The wave front aberration distribution caused by astigmatism viewed on the pupil plane of the object lens 5 is not peculiar to the optical system shown in FIG. 1 and a similar distribution pattern is applied to other optical systems having astigmatism. The astigmatism direction varies from one optical system to another and the direction of the pattern shown in FIG. 4A changes. That is, the X-X' and Y-Y' axes in FIG. 4A rotate. Further, the wave front aberration amount based on astigmatism also varies from one optical system to another. In the embodiment, an appropriate wave front aberration correction can be made in response to the astigmatism direction and the wave front aberration amount of each optical system; this topic will be described later in detail.

To decrease the effect of astigmatism, $W_{rms}$ in [Expression 4] may be lessened. Thus, $W_{AS}$ (r, φ) itself may be lessened or wave front aberration of the opposite polarity to $W_{AS}$ (r, φ), namely, $-W_{AS}$ (r, φ) may be given to the light beam passing through the liquid crystal panel 3. The invention adopts the latter method for decreasing the effect of the astigmatism $W_{AS}$ (r, φ) caused by the optical system in the optical pickup. Thus, before a light beam is converged at the object lens 5, $-W_{AS}$ (r, φ) is given to the light beam by the liquid crystal panel 3 as astigmatism correction means for canceling astigmatism.

In the embodiment, to give the wave front aberration of $-W_{AS}$ (r, φ), a voltage different for each division area is applied to the transparent electrode 22A, 22B formed in the liquid crystal panel 3. Thus, the orientation of the liquid crystal molecules M relative to the optical axis can be changed for each division area so that a refractive index varies from one division area to another. Thus, a phase difference different for each area is given to the light beam passing through the liquid crystal panel 3.

If the phase difference given in the liquid crystal panel 3 is $W_{LC}$ (r, φ), the wave front aberration W (r, φ) on the pupil plane of the object lens 5 when the liquid crystal panel 3 is placed is given by the following expression:
[Expression 5]

$$W(r,\phi)=W_{AS}(r,\phi)+W_{LC}(r,\phi).$$

To cancel $W_{AS}$ (r, φ) of astigmatism, wave front aberration of the opposite polarity to astigmatism $W_{AS}$ (r, φ) caused by the optical system in the optical pickup, namely, the wave front aberration indicated in the following expression may be given to the light beam by the liquid crystal panel 3:
[Expression 6]

$$W_{LC}(r,\phi)=-W_{AS}(r,\phi).$$

To give the wave front aberration indicated in [Expression 6] to the light beam, the applied voltages to the transparent electrode 22A, 22B may be controlled so as to give wave front aberration of the opposite polarity to astigmatism for each division area of the liquid crystal panel 3. Here, a description will be given of two embodiments which apply the voltages to the transparent electrode 22A, 22B.
[First Embodiment]

According to a first embodiment of the present invention, the liquid crystal panel 3 is divided corresponding to the wave front aberration distribution caused by the optical system in the optical pickup shown in FIG. 4A. Accordingly, the transparent electrode 22A of the liquid crystal panel 3 is made the pattern electrodes almost similar to the wave front aberration distribution caused by astigmatism on the pupil plane of the object lens in FIG. 4A.

Figure 5:
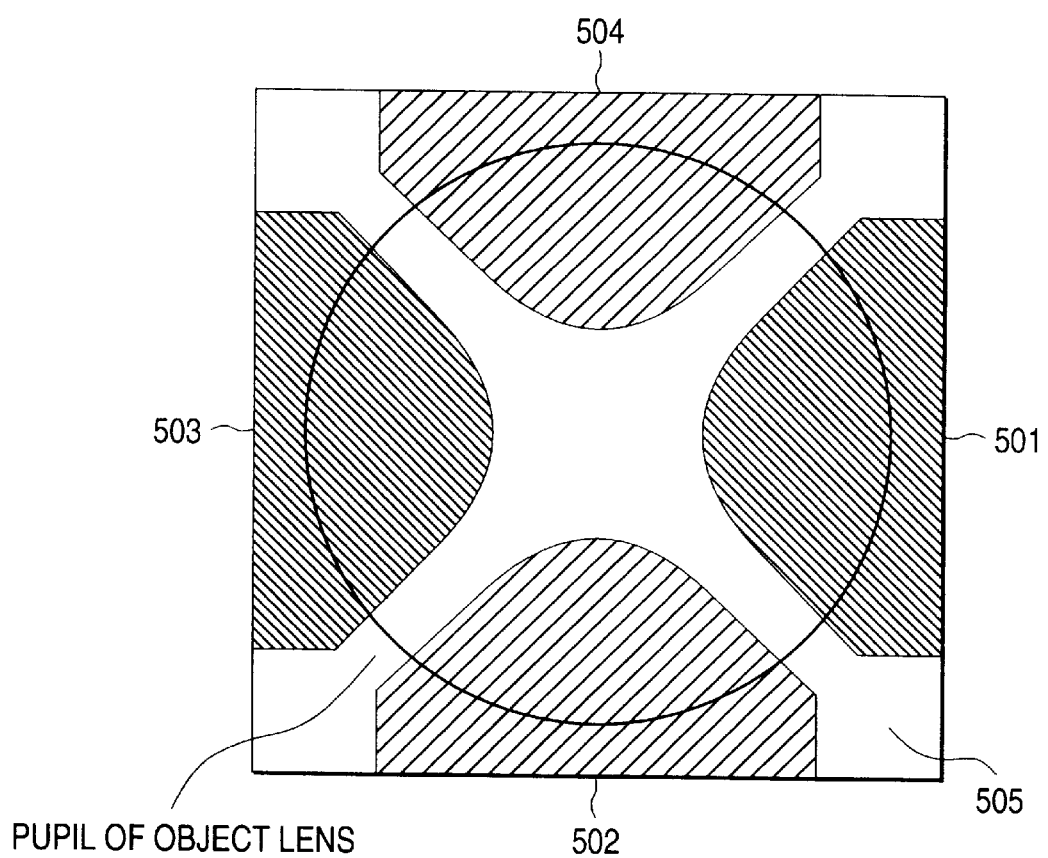
FIG. 5 is a drawing to show pattern electrodes of the liquid crystal panel in the first embodiment of the invention.

FIG. 5 shows an example that the transparent electrode 22A of the liquid crystal panel 3 is divided so that astigmatism of FIG. 4A can be canceled. As shown here, the transparent electrode 22A is divided into five pattern electrodes 501 to 505. A circle of FIG. 5 is shown corresponding to the pupil of the object lens 5. Placement of the liquid crystal panel 3 in the pickup is determined so that the light beam passes through the circle.

Next, a drive method of the liquid crystal panel 3 to correct astigmatism will be discussed.

In the transparent electrode 22A, rectangular wave is applied to each of the division electrodes 501 to 505. The corresponding transparent electrode 22B is set to be ground level. The voltage corresponding to amplitude of the rectangular wave is applied to each of the division electrodes. That is, the control of the amplitude of the rectangular wave adjusts the voltage applied to each of the division electrodes, change the refractive index, to thereby give a desired phase difference to the light beam passing through the liquid crystal panel 3.

Figure 6:
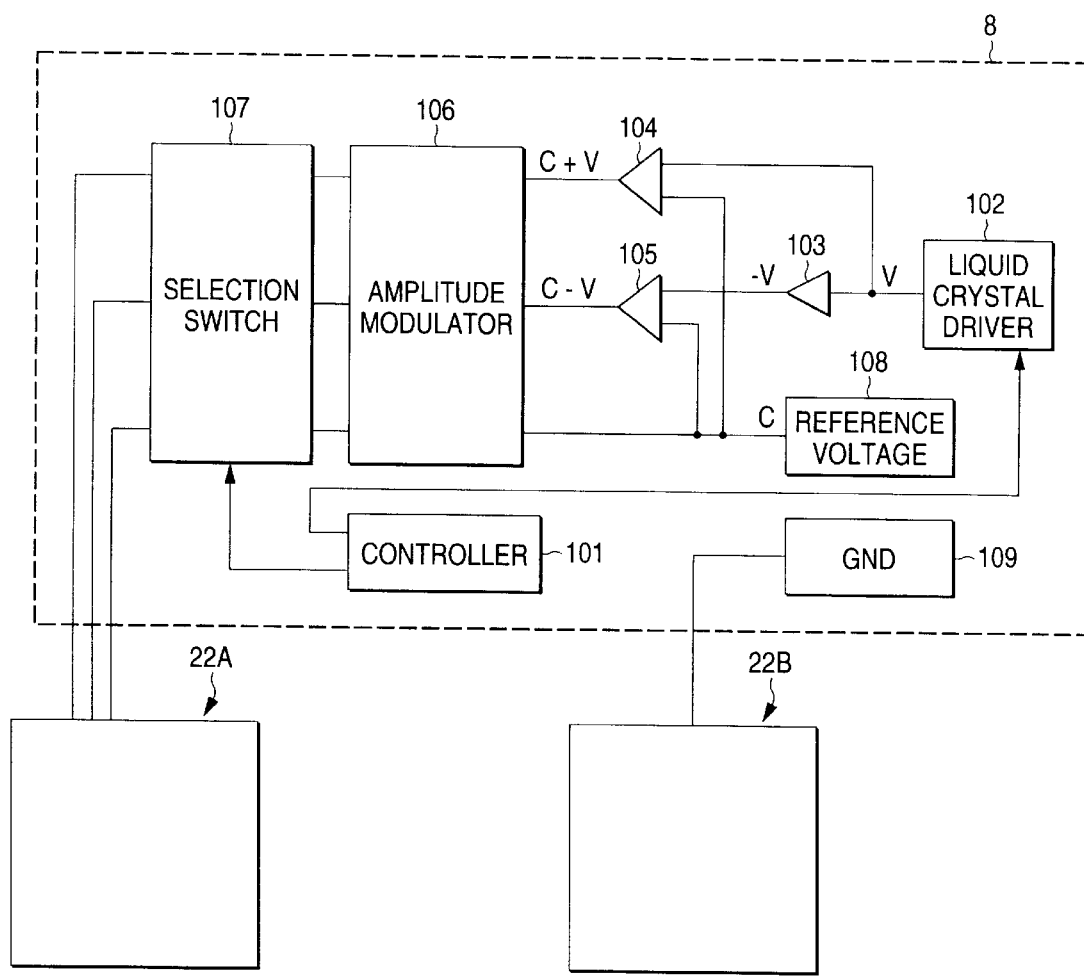
FIG. 6 is a block diagram to show the configuration of the liquid crystal panel control section in the first embodiment of the invention.

FIG. 6 is a block diagram to show the configuration of the liquid crystal panel control section 8. As shown here, the liquid crystal panel control section 8 includes a controller 101 such as a CPU, a liquid crystal driver 102, an inverter 103, adders 104 and 105, an amplitude modulator 106, and a selection switch 107. The liquid crystal panel control section 8 is connected to the liquid crystal panel 3 so as to be able to apply voltage to the pattern electrodes of the transparent electrode 22A of the liquid crystal panel 3 through the selection switch 107. The liquid crystal panel control section 8 further includes a grand level terminal 109 for the transparent electrode 22B opposing to the transparent electrode 22A.

In the configuration in FIG. 6, the controller 101 controls the liquid crystal driver 102 and the selection switch 107. Predetermined voltage V output from the liquid crystal driver 102 is input to the adder 104 and voltage −V output through the inverter 103 is input to the adder 105. The adder 104 (105) adds the input voltage and reference voltage C together. The adder 104 outputs voltage C+V and the adder 105 outputs voltage C−V.

Three types of voltages of the voltage C+V output from the adder 104, the voltage C−V output from the adder 105, and the reference voltage C are input to the amplitude modulator 106, which then outputs drive signals of rectangular waves amplitude-modulated in response to the voltages. Here, the drive signal corresponding to the voltage C+V is represented as Va, the drive signal corresponding to the voltage C−V is represented as Vb, and the drive signal corresponding to the reference voltage C is represented as Vc.

The relationship between the waveform patterns of the drive signals applied to the pattern electrodes 501 to 505 and phase differences given to a light beam will be discussed with reference to FIGS. 7 and 8.

Figure 7:
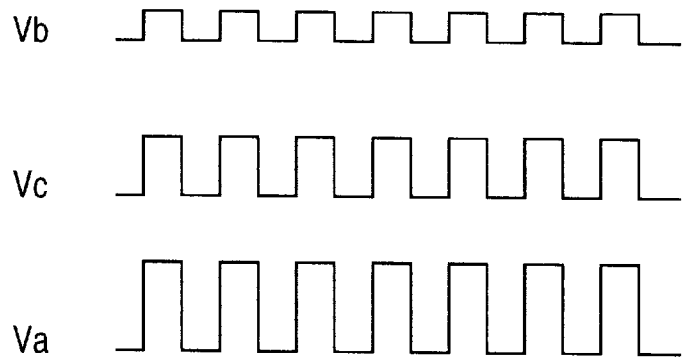
FIG. 7 is a chart to show the waveform patterns of the drive signals given to the liquid crystal panel in the first and second embodiments of the invention.

FIG. 7 is a chart to show the waveform patterns of the drive signals Va, Vb, and Vc. FIG. 8 is a drawing to show the phase differences corresponding to the amplitudes of the drive signals. The waveform pattern of the drive signal Vc corresponding to the reference voltage C is shown at the middle stage of FIG. 7. The drive signal Vb has an amplitude smaller than the drive signal Vc has and the drive signal Va has an amplitude larger than the drive signal Vc. As shown in FIG. 8, the reference drive signal Vc is applied, whereby reference phase φc is given to a light beam.

The waveform pattern of the drive signal Vb corresponding to the voltage C−V is shown at the top stage of FIG. 7. The drive signal Vb is applied, whereby phase φb delayed from the reference phase φc is given to a light beam. As shown in FIG. 8, the light beam passing through the area driven by the drive signal Vb has a phase delayed by φc−φb from the reference. That is, negative phase difference φb−φc occurs in the light beam.

The waveform pattern of the drive signal Va corresponding to the voltage C+V is shown at the bottom stage of FIG. 7. The drive signal Va is applied, whereby phase φa leading the reference phase φc is given to a light beam. As shown in FIG. 8, the light beam passing through the area driven by the drive signal Va has a phase leading by φa–φc the reference. That is, positive phase difference φa–φc occurs in the light beam.

Figure 8:
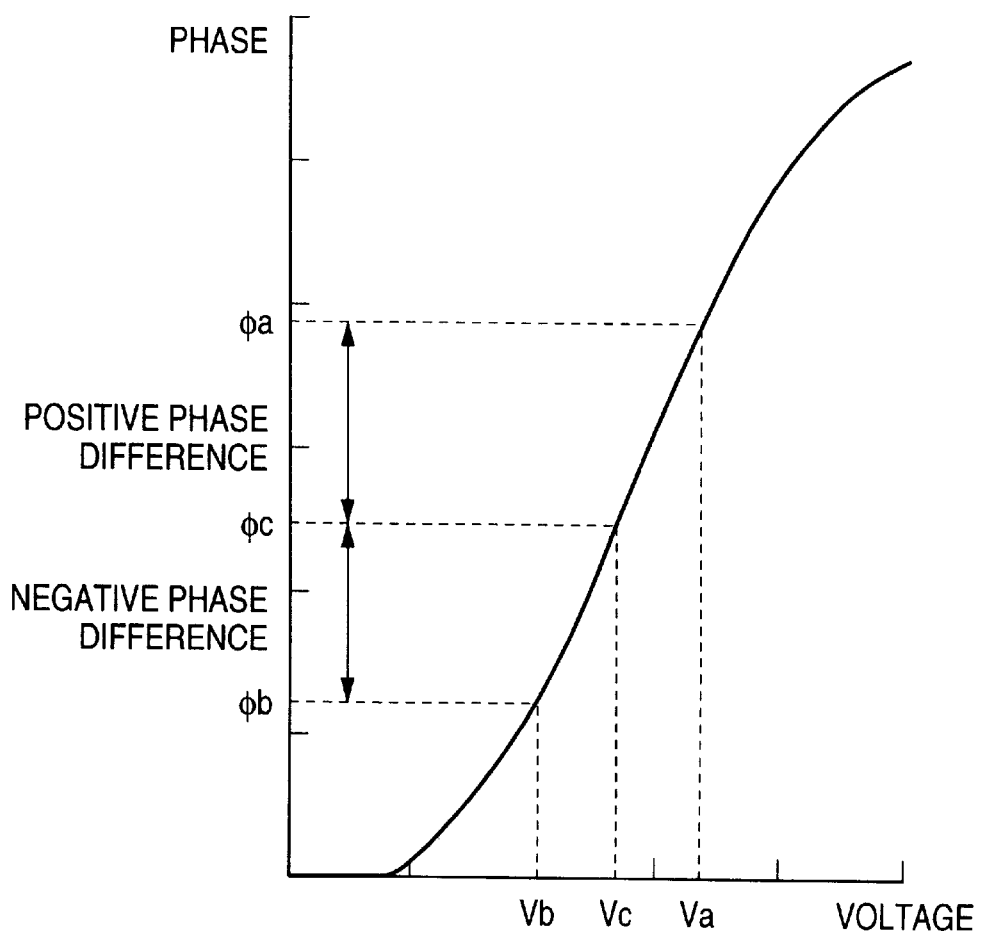
FIG. 8 is a drawing to show the relationship between the drive signals given to the liquid crystal panel and phase differences in the first and second embodiments of the invention.

As seen in FIG. 8, the phase difference given to the light beam changes almost linearly with respect to voltage change, thus the negative phase difference φb–φc and the positive phase difference φa–φc are equal in absolute value and different in sign. Therefore, astigmatism having a symmetric distribution can be covered.

Any of the drive waveform Va, Vb, or Vc is applied to the division electrodes 501 to 505 in FIG. 5 in response to the astigmatism which occurs. The amplitude of va, vb is adjusted in response to the astigmatism size. The phase differences φc–φb and φa–φc are equal in absolute value and different in sign because of symmetry of astigmatism.

Next, the drive waveforms applied to the division electrodes for correcting the wave front aberration distribution caused by astigmatism on the pupil plane of the object lens in FIG. 4A will be discussed.

Since the wave front aberration in FIG. 4A in the area of the division electrode 501 is in the negative direction (the black area on the X' side in FIG. 4A; astigmatism of about $-0.025\lambda$ to $-0.15\lambda$), to cancel the wave front aberration, the drive waveform va is applied to the division electrode 501 so as to give a phase difference in the positive direction to the luminous flux passing through the liquid crystal.

Since the wave front aberration in FIG. 4A in the area of the division electrode 502 is in the positive direction (the black area on the Y' side in FIG. 4A; astigmatism of about $+0.025\lambda$ to $+0.15\lambda$), to cancel the wave front aberration, the drive waveform vb is applied to the division electrode 502 so as to give a phase difference in the negative direction to the luminous flux passing through the liquid crystal.

Since the wave front aberration in FIG. 4A in the area of the division electrode 503 is in the negative direction, to cancel the wave front aberration, the drive waveform va is applied to the division electrode 503 so as to give a phase difference in the positive direction to the luminous flux passing through the liquid crystal. The applied drive waveform to the division electrode 503 is the same as that to the division electrode 501 because of symmetry of the wave front aberration distribution caused by astigmatism.

Since the wave front aberration in FIG. 4A in the area of the division electrode 504 is in the positive direction, to cancel the wave front aberration, the drive waveform vb is applied to the division electrode 504 from the liquid crystal drive means 9 so as to give a phase difference in the negative direction to the luminous flux passing through the liquid crystal. The applied drive waveform to the division electrode 504 is the same as that to the division electrode 502 because of symmetry of the wave front aberration distribution caused by astigmatism.

The drive waveform vc is applied to the division electrode 505 to give the reference phase φc as described above.

Figure 9A:
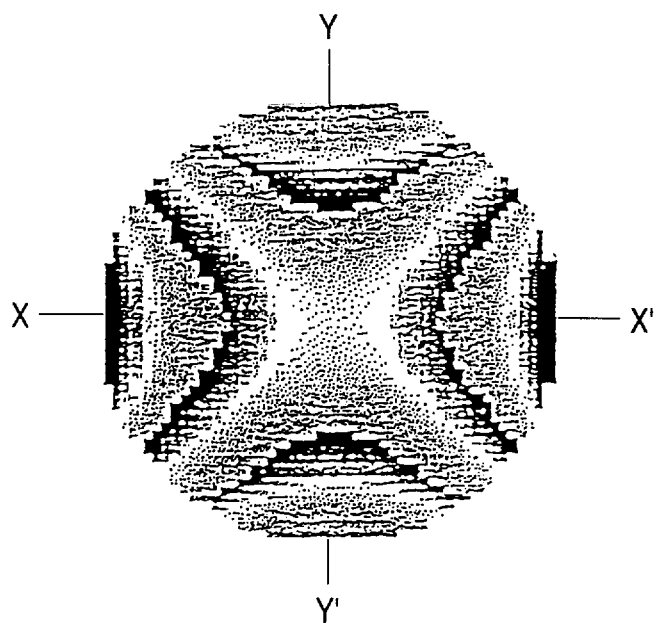
FIGS. 9A to 9C are drawings to show a wave front aberration distribution on an object lens pupil plane when the liquid crystal panel is used to correct astigmatism in the first embodiment of the invention.
Figure 9B:
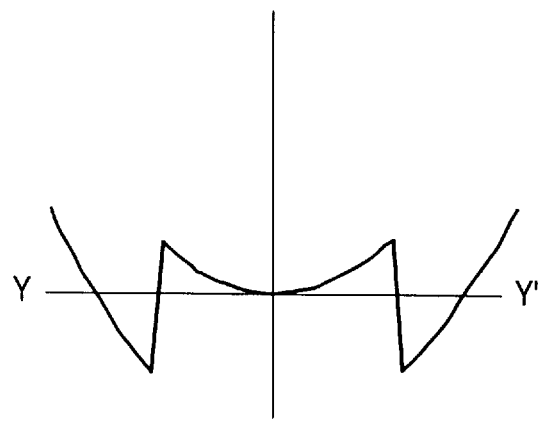
Figure 9C:
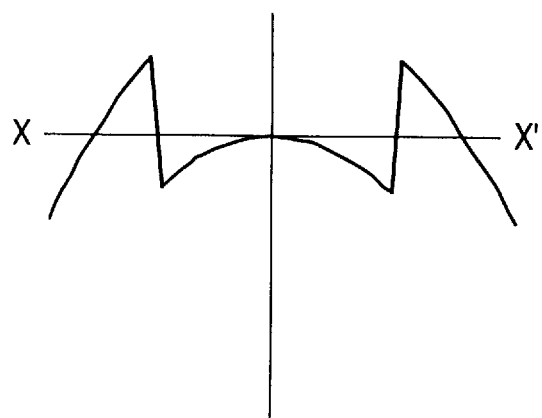

If the liquid crystal panel 3 thus driven is placed between the object lens and the laser light source and wave front aberration of the opposite polarity to the astigmatism $W_{AS}(r,\phi)$ caused by the optical system in the optical pickup is given, the standard deviation of the wave front aberration, $W_{rmsLC}$ is
[Expression 7]

$$W_{rmsLC}=\sqrt{\int\int(W_{LC(r,\phi)}-W_{OLC})^2 drd\phi/\pi}$$

where $W_{OLC}$ is an average value of the phase difference $W(r, \phi)$ given through the liquid crystal panel 3. FIGS. 9A to 9C illustrates $W_{rmsLC}$. FIG. 9A shows a wave front aberration distribution calculated according to [Expression 7], FIG. 9B is a sectional view taken on line Y-Y' in FIG. 9A, and FIG. 9C is a sectional view taken on line X-X' in FIG. 9A. As compared with FIG. 4, the dark portions decrease and as the result of the correction through the liquid crystal panel 3, the wave front aberration caused by astigmatism on whole the pupil plane decreases.

Figure 10:
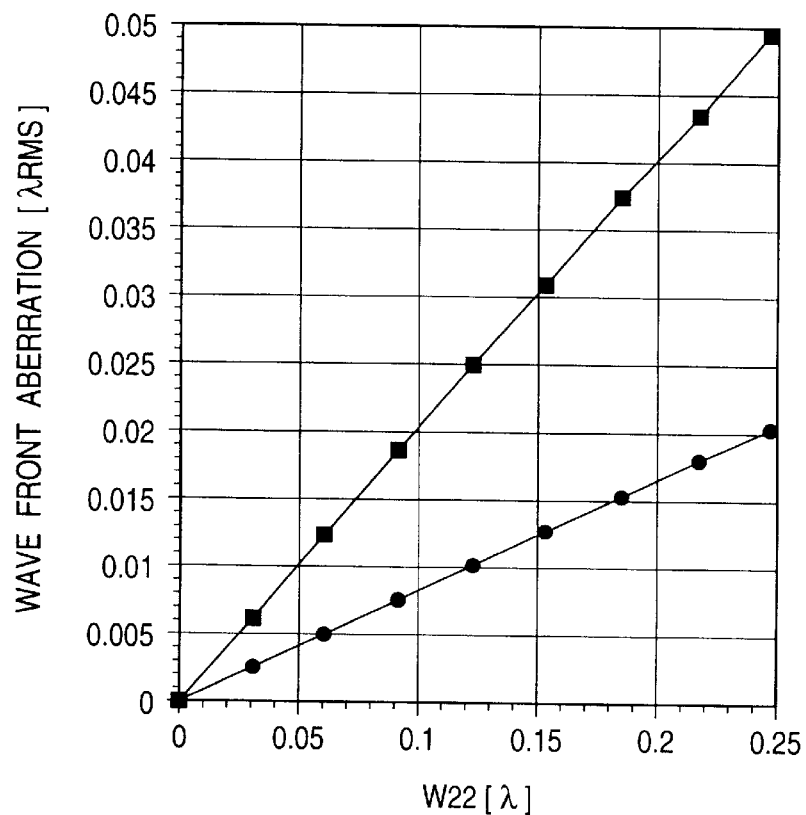
FIG. 10 is a graph to show the correction effect of the liquid crystal panel in the first embodiment of the invention.

FIG. 10 is a graph to show $W_{rms}$ of wave front aberration when the liquid crystal panel 3 is used (line with black dots in the figure) and that when the liquid crystal panel 3 is not used (line with black squares in the figure) wherein the aberration coefficient W22 in [Expression 2] is changed. The vertical axis indicates RMS of wave front aberration and the horizontal axis indicates the aberration coefficient W22. As seen in FIG. 10, if the liquid crystal panel 3 is used, the wave front aberration (wave front aberration caused by astigmatism) is decreased to 50% or less.

The astigmatism does not change when an optical disc is played back, and is caused by the optical system of the optical pickup used to play back an optical disc. Thus, the astigmatism is always constant regardless of the disc state, and the phase difference to be given may be adjusted in the liquid crystal panel so that the astigmatism becomes the best at the stage of product assembly, etc. To do this, the astigmatism direction and size in the optical pickup in which optical parts other than the liquid crystal panel 3 are placed may be measured and the measured astigmatism direction and the direction of the liquid crystal panel may be made the same. That is, the orientation of the liquid crystal panel 3 is determined and the liquid crystal panel 3 is installed so that the wave front aberration caused by the astigmatism becomes the minimum on the pupil plane of the lens.

After the liquid crystal panel 3 is installed, output voltage V from the liquid crystal driver 102 is adjusted in response to the measured astigmatism size. According to the voltage V, the drive waveform Va applied to the division electrodes 501 and 503 is output from the amplitude modulator 106. In addition, the voltage is converted into –V through the inverter 103. According to –V, the drive waveform Vc applied to the division electrodes 502 and 504 is output from the amplitude modulator 106. The liquid crystal panel control section 8 is thus configured, whereby only one type of voltage needs to be output from the liquid crystal driver 102, so that control is simplified.

[Second Embodiment]

Next, according to a second embodiment of the present invention, a method which can cancel astigmatism with respect to various directions will discussed.

Figure 11:
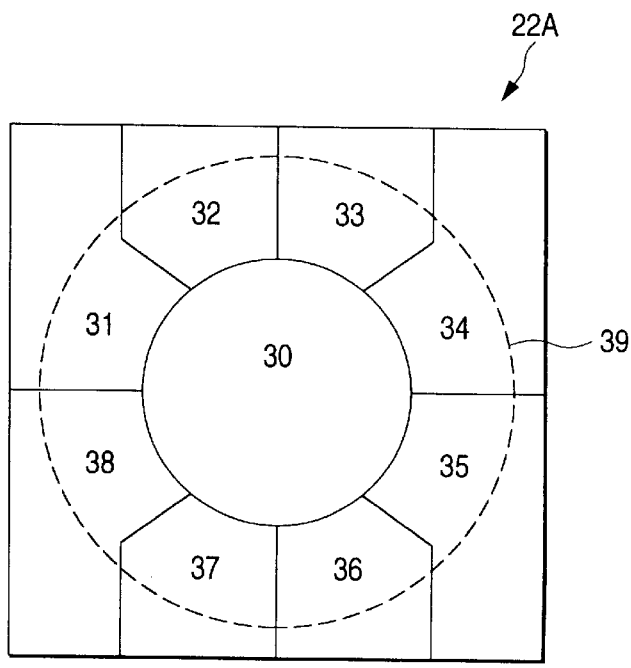
FIG. 11 is a block diagram to show the configuration of the liquid crystal panel control section in the second embodiment of the invention.

FIG. 11 is a drawing to show a state in which the transparent electrode 22A of the liquid crystal panel 3 is divided so that astigmatism in various directions can be canceled. As shown here, the transparent electrode 22A is divided into nine pattern electrodes 30 to 38. In FIG. 11, a light beam incidence range 39 is also shown corresponding to the pupil of the object lens 5. Placement of the liquid crystal panel 3 in the pickup is determined so that the light beam passes through the incidence range 39.

In FIG. 11, a circular pattern electrode 30 is formed corresponding to the center portion of the incidence range 39. Eight pattern electrodes 31 to 38 into which the transparent electrode 22A is divided in a radial pattern are formed in the outer peripheral portion, and are placed symmetrically so that they are spaced at almost equal angle from the center of the incidence range 39. The pattern electrodes 31 and 35, 32 and 36, 33 and 37, and 34 and 38 face each other and are placed symmetrically with respect to the center so as to cover specific directions of astigmatism.

Figure 12:
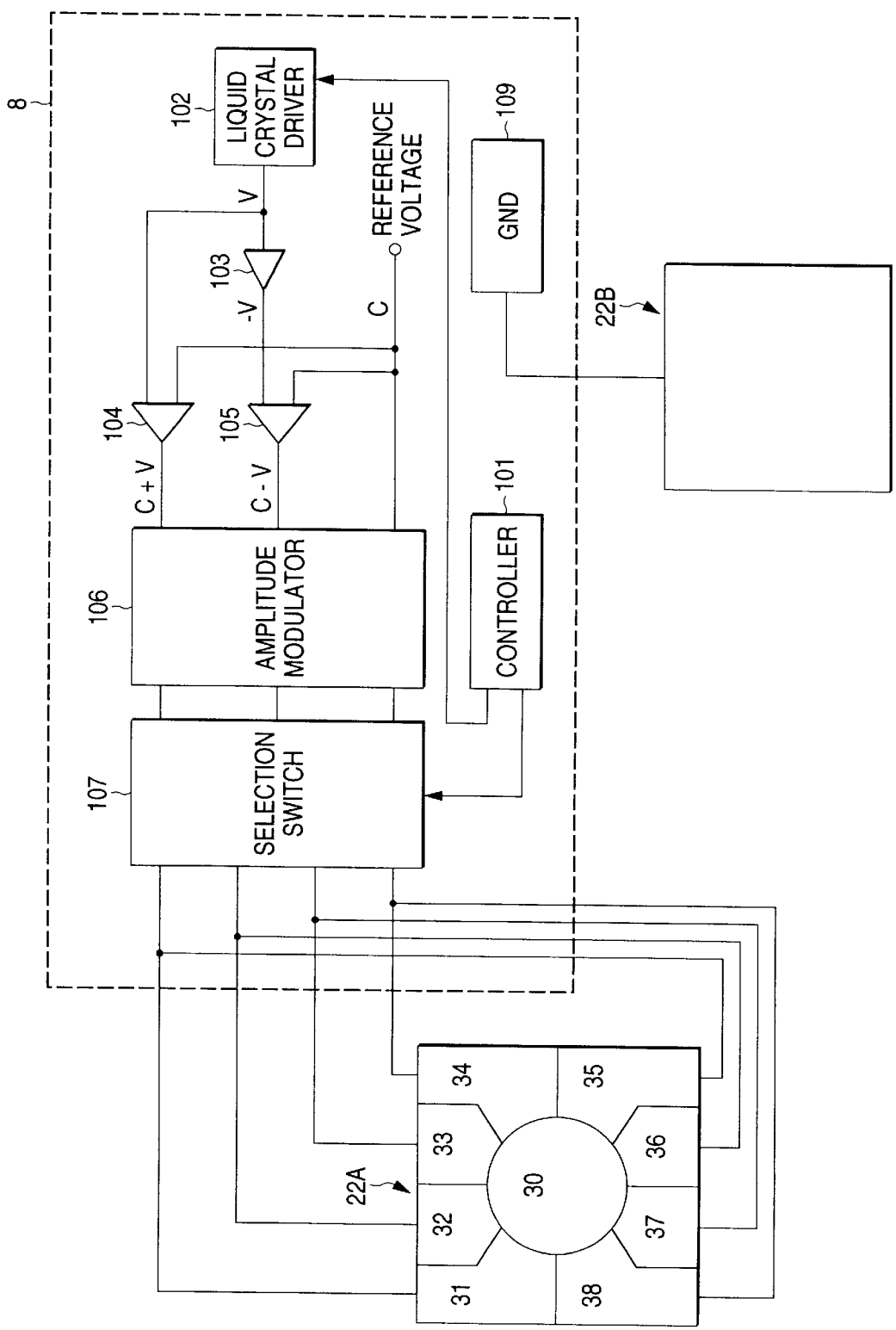
FIG. 12 is a block diagram to show the configuration of the liquid crystal panel control section in the second embodiment of the invention.

As shown in FIG. 12, a drive method of the liquid crystal panel 3 to correct astigmatism is the same as the drive method of the first embodiment shown in FIG. 6. The controller 101 controls the liquid crystal driver 102 and the selection switch 107 in accordance with the direction of astigmatism determined by processing described later.

The selection switch 107 is changed in connection under the control of the controller 101 for applying the drive signals Va, Vb, and Vc to the pattern electrodes 30 to 38 of the liquid crystal panel 3. The reference drive signal Vc is fixedly applied to the pattern electrode 30 at the center; any of the drive signal Va, Vb, or Vc is applied to the pattern electrodes 31 to 38 in the outer peripheral portion. Nine connection combinations are set corresponding to the presence, absence, and direction of astigmatism, as described later. The transparent electrode 22B may always be grounded.

The relationship between the waveform patterns of the drive signals applied to the pattern electrodes 30 to 38 and phase differences given to a light beam is the same as the first embodiment, and thus explanation will be omitted.

FIG. 13 is a table to show drive patterns for applying the drive signals Va, Vb, and Vc to the pattern electrodes 30 to 38 in the selection switch 107. As shown here, nine drive patterns can be set. In every drive pattern, the drive signal Vc is applied to the pattern electrode 30 corresponding to the center portion of the liquid crystal panel 3. On the other hand, any of Va, Vb, or Vc is applied to the pattern electrodes 31 to 38 in the outer peripheral portion and eight drive patterns A to H are set to give a desired phase difference to a light beam in response to the astigmatism direction. In addition, in drive pattern I, the reference drive voltage Vc is applied to all pattern electrodes 30 to 38; the drive pattern I is applied when no astigmatism correction is made.

Figure 14A:
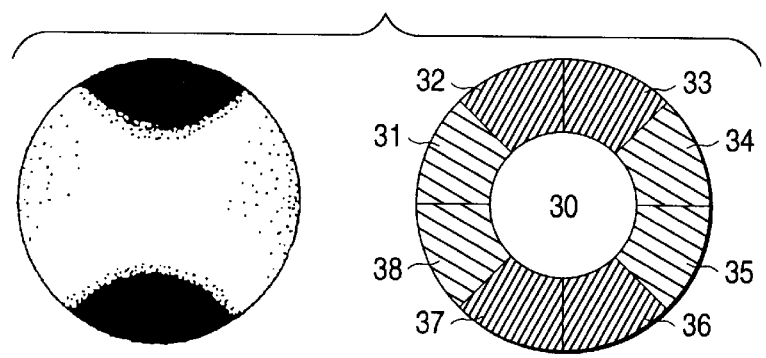
FIGS. 14A to 14D are drawings to show the relationship between liquid crystal panel drive patterns and astigmatism directions in the second embodiment of the invention.
Figure 14B:
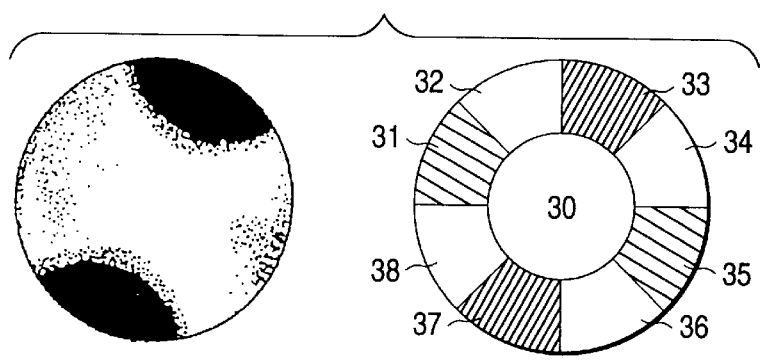
Figure 14C:
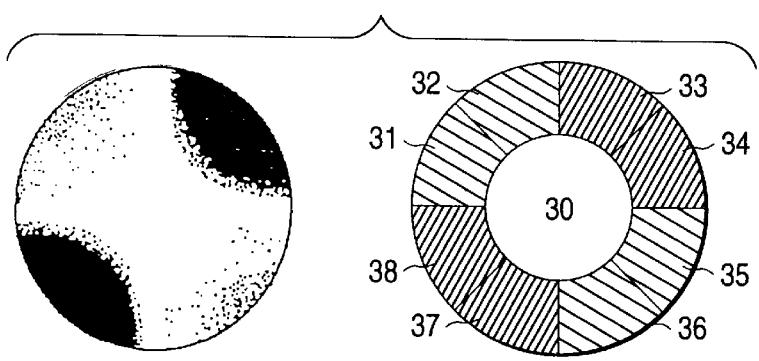
Figure 14D:
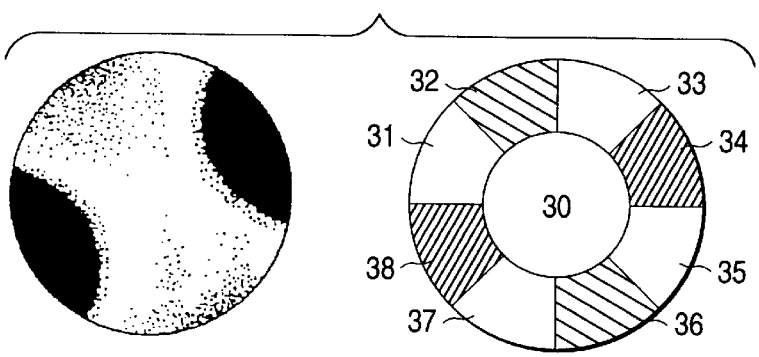

The relationship between the astigmatism directions and the drive patterns applied to the pattern electrodes 30 to 38 will be discussed with reference to FIGS. 14A to 14C. In the embodiment, to correct a wave front aberration distribution caused by astigmatism having arbitrary directionality, the angle is divided into eight parts and the drive pattern is changed in steps of almost 22.5 degrees. FIGS. 14A to 14D show wave front aberration distributions caused by astigmatism and drive patterns corresponding thereto side by side. For simplicity, they are shown only at four astigmatism angles of 0 degrees, 22.5 degrees, 45 degrees, and 67.5 degrees.

FIG. 14A is a drawing corresponding to the case where the astigmatism direction becomes 0 degrees. In the longitudinal direction, dark portions from the center toward peripheral parts, namely, portions where the wave front aberration distribution grows in the negative direction occur symmetrically in the placement. Therefore, to cancel the wave front aberration, the positive phase difference needs to be given to the upper pattern electrodes 32 and 33 and the lower pattern electrodes 36 and 37. On the other hand, in the lateral direction, the wave front aberration distribution grows in the positive direction, thus the negative phase difference needs to be given to the left pattern electrodes 31 and 38 and the right pattern electrodes 34 and 35. Therefore, the drive pattern A shown in FIG. 13 may be used for driving, namely, the drive signal Va may be applied to the pattern electrodes 32, 33, 36, and 37 and the drive signal Vb may be applied to the pattern electrodes 31, 33, 35, and 36.

FIG. 14B is a drawing corresponding to the case where the astigmatism direction becomes 22.5 degrees; the astigmatism direction is rotated 22.5 degrees from the state in FIG. 14A. In this case, the pattern electrodes 31 to 38 are placed in 45-degree division areas, thus it is necessary to rotate half the angle of 45 degrees and drive. In the embodiment, the drive pattern is designed for covering the astigmatism rotated 22.5 degrees substantially. That is, the positive phase difference is given to the pattern electrodes 33 and 37 and the negative phase difference is given to the pattern electrodes 31 and 35. The reference phase difference is given to the pattern electrodes 32, 34, 36, and 38. Therefore, the drive pattern B shown in FIG. 13 may be used for driving, namely, the drive signal Va may be applied to the pattern electrodes 33 and 37, the drive signal Vb may be applied to the pattern electrodes 31 and 35, and the drive signal Vc may be applied to the pattern electrodes 32, 34, 36, and 38.

FIG. 14C is a drawing corresponding to the case where the astigmatism direction becomes 45 degrees; the astigmatism direction is rotated 45 degrees from the state in FIG. 14A. In this case, the pattern electrodes 31 to 38 in FIG. 14A may be shifted one position for driving. That is, the positive phase difference needs to be given to the pattern electrodes 33, 34, 37, and 38 and the negative phase difference needs to be given to the pattern electrodes 31, 32, 35, and 36. Therefore, the drive pattern C shown in FIG. 13 may be used for driving, namely, the drive signal Va may be applied to the pattern electrodes 33, 34, 37, and 38 and the drive signal Vb may be applied to the pattern electrodes 31, 32, 35, and 36.

FIG. 9D is a drawing corresponding to the case where the astigmatism direction becomes 67.5 degrees; the astigmatism direction is rotated 45 degrees from the state in FIG. 14B. In this case, the pattern electrodes 31 to 38 in FIG. 14B may be shifted one position for driving. That is, the positive phase difference is given to the pattern electrodes 34 and 38 and the negative phase difference is given to the pattern electrodes 32 and 36. The reference phase difference is given to the pattern electrodes 31, 33, 35, and 37. Therefore, the drive pattern D shown in FIG. 13 may be used for driving, namely, the drive signal Va may be applied to the pattern electrodes 34 and 38, the drive signal Vb may be applied to the pattern electrodes 32 and 36, and the drive signal Vc may be applied to the pattern electrodes 31, 33, 35, and 37.

For the pattern electrode 30 in the center portion, it may be considered that the phase difference in the wave front aberration distribution is almost zero in FIGS. 14A to 14D, thus the drive signal Vc may be applied fixedly.

The drive patterns may be considered in a similar fashion if the angle corresponding to the astigmatism direction becomes furthermore large. That is, if the angles become 0 degrees, 45 degrees, 90 degrees, and 135 degrees, as shown in FIG. 14A, a drive pattern wherein the positive and negative phase differences are repeated every two pattern electrodes may be adopted. If the angles become 22.5 degrees, 67.5 degrees, 112.5 degrees, and 157.5 degrees, a drive pattern wherein the positive and negative phase differences with the reference phase difference therebetween are repeated every pattern electrode may be adopted. Thus, if astigmatism caused by the optical system distributes in any direction, it can be handled appropriately in the wave front aberration direction by driving the liquid crystal panel 3 corresponding to the nearest angle in steps of 22.5 degrees. In addition, if the drive voltage is adjusted appropriately corresponding to the wave front aberration amount, an optimum correction for the astigmatism caused by the optical system can be made.

Figure 15:
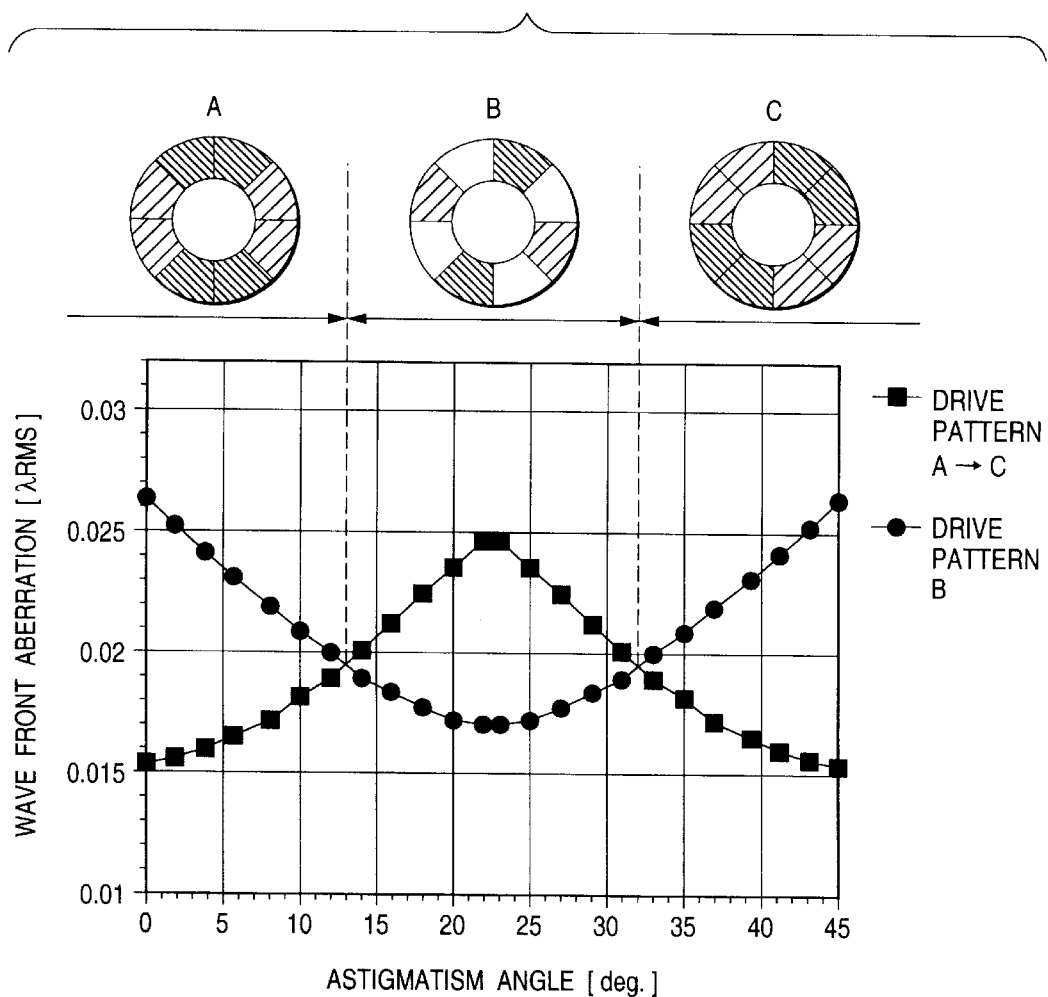
FIG. 15 is a drawing to show change in wave front aberration responsive to a drive pattern when the astigmatism direction changes gradually in the second embodiment of the invention.

FIG. 15 is a drawing to show change in wave front aberration that can be corrected in response to the drive pattern when the angle indicating the astigmatism direction changes gradually. That is, it shows a characteristic for determining at which angle the drive pattern is to be switched in response to the astigmatism direction for making an optimum correction.

As shown in FIG. 15, when the astigmatism direction changes in the range of 0 degrees to 45 degrees, wave front aberration corrected is plotted for the three drive patterns of the drive pattern A corresponding to FIG. 14A, the drive pattern B corresponding to FIG. 14B, and the drive pattern C corresponding to FIG. 14C. Since the drive patterns A and C are provided by rotating the same drive pattern 45 degrees, they are switched in the vicinity of 22.5 degrees. Thus, FIG. 15 represents the characteristics corresponding to the drive patterns A and C and the characteristic corresponding to the drive pattern B.

As seen in FIG. 15, when the angle is 0 degrees, the wave front aberration with the drive pattern A becomes the minimum and when the angle is 45 degrees, the wave front aberration with the drive pattern C becomes the minimum, but the wave front aberration increases gradually at angles between 0 and 45 degrees. In contrast, the wave front aberration with the drive pattern B becomes the minimum in the vicinity of the angle 22.5 degrees, but increases as the angle increases or decreases.

In FIG. 15, the characteristics of the drive patterns A and B cross in the vicinity of the angle 13 degrees and the characteristics of the drive patterns C and B cross in the vicinity of the angle 32 degrees. That is, the drive pattern A provides the best characteristic in the angle range of 0 degrees to 13 degrees; the drive pattern B provides the best characteristic in the angle range of 13 degrees to 32 degrees; and the drive pattern C provides the best characteristic in the angle range of 32 degrees to 45 degrees. Therefore, if the drive patterns are switched at the angles, the wave front aberration relative to the astigmatism direction can be made the best and a proper wave front aberration correction can be made. The same also applies to larger angles.

In fact, it is difficult to find the angle corresponding to the astigmatism direction. Thus, for example, jitter of a playback signal, etc., is optimized or a drive pattern such that the RF signal amplitude becomes the maximum is selected for indirectly finding the optimum angle corresponding to the astigmatism direction.

Next, adjustment methods for determining an optimum drive method of the liquid crystal panel 3 in response to the astigmatism direction and the wave front aberration amount in the second embodiment will be discussed with reference to flowcharts shown in FIGS. 16 to 20. That is, an optimum drive pattern corresponding to the astigmatism direction is selected from among the nine drive patterns A to I and the optimum value to be set as the drive voltage is determined. In the embodiment, a method excellent in adjustment accuracy and an adjustable method in a short time will be discussed.

FIG. 11 is a flowchart to show an example of an adjustment method of driving in all combinations that can be set and determining the optimum drive pattern and drive voltage. The processing shown in FIG. 16 may be performed at the last stage of manufacturing or at the product power on time, for example.

Figure 16:
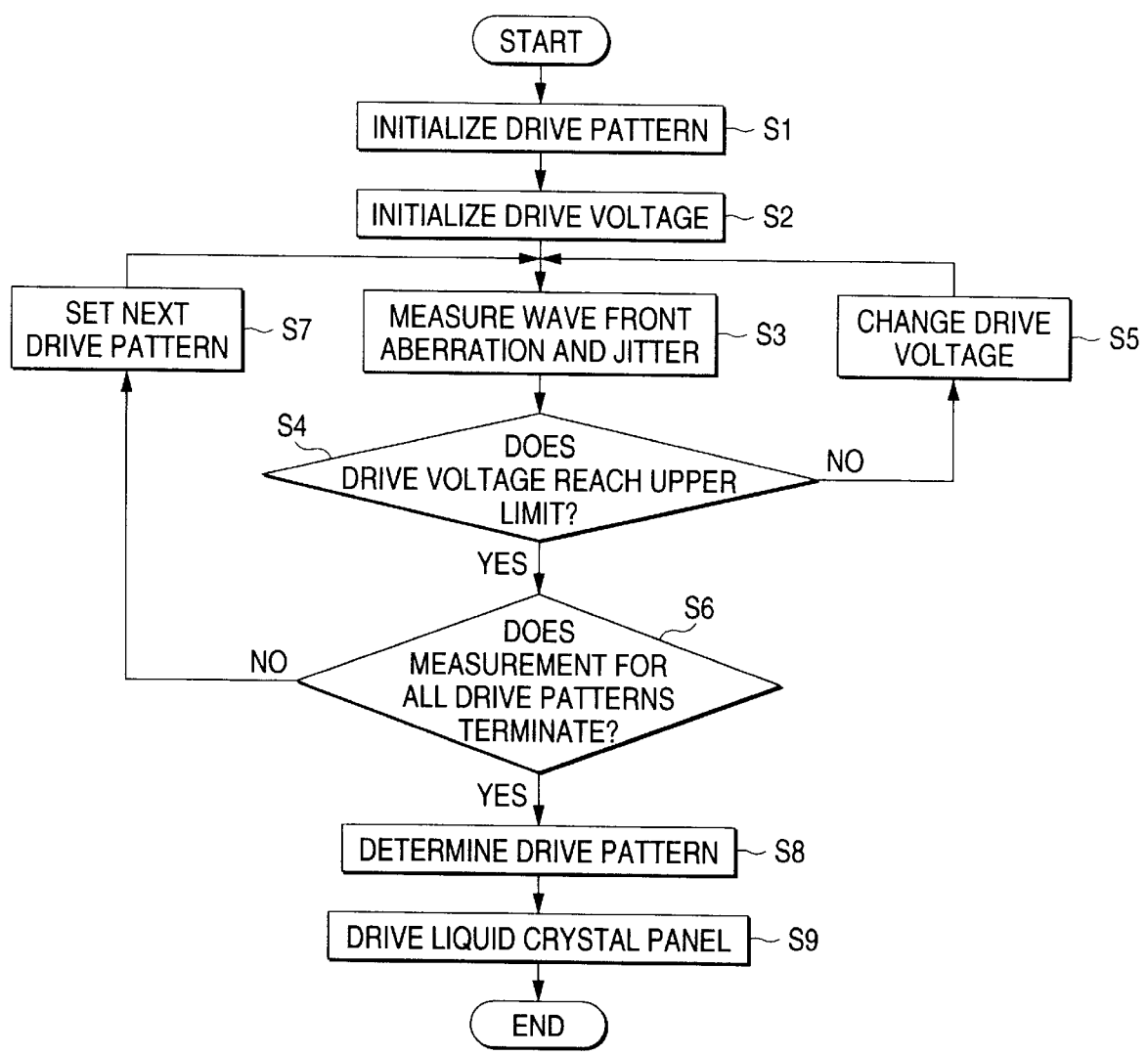
FIG. 16 is a flowchart to show an adjustment method of the liquid crystal panel for driving in all combinations that can be set in the second embodiment of the invention.

When the processing shown in FIG. 16 is started, the drive pattern is initialized at step S1. That is, the drive pattern for first driving the liquid crystal panel 3 is selected from among the drive patterns A to H shown in FIG. 13. Here, the liquid crystal panel 3 is driven in order starting at the drive pattern A and the selection switch 107 is set to the drive pattern A.

At step S2, drive voltage is initialized. In the embodiment, for example, about 32 types of drive voltages can be set and the minimum value of the drive voltages is set. The drive voltage setup value may be stored in a table in ROM (not shown), etc.

At step S3, the liquid crystal panel 3 is actually driven according to the setup drive pattern and drive voltage, and jitter and wave front aberration are measured. That is, if astigmatism is not corrected, jitter involved in playback of the optical disc 10 increases and the wave front aberration itself grows, thus it is made possible to determine whether or not the correction is proper by measuring the jitter and wave front aberration. The obtained measurement values may be temporarily stored in a memory unit (not shown).

At step S4, whether or not the drive voltage reaches the upper limit is determined. That is, whether or not processing for 32 steps of drive voltages is terminated is determined while holding the setting of the drive pattern. If the drive voltage reaches the upper limit (step S4, YES), control goes to step S6. On the other hand, if the drive voltage does not reach the upper limit (step S4, NO), control goes to step S5 and the drive voltage is changed to the next step of drive voltage, then control returns to step S3.

At step S6, whether or not measurement for the eight drive patterns A to H is terminated is determined. If measurement for all eight drive patterns A to H is terminated (step S6, YES), control goes to step S8. On the other hand, if measurement for a drive pattern is not terminated (step S6, NO), control goes to step S7 and the drive pattern corresponding to the next astigmatism angle is set, then control returns to step S3.

At step S8, an optimum drive pattern and drive voltage combination is determined. At this stage, measurement of jitter or wave front aberration for 8×32 combinations is complete, thus the measurement values are read and one combination in which jitter or wave front aberration becomes the best is determined.

At step S9, the liquid crystal panel 3 is driven by the liquid crystal panel control section 8 in accordance with the combination determined at step S8, whereby an appropriate phase difference is given to the light beam passing through the liquid crystal panel 3 and astigmatism caused by the optical system can be canceled.

Figure 17:
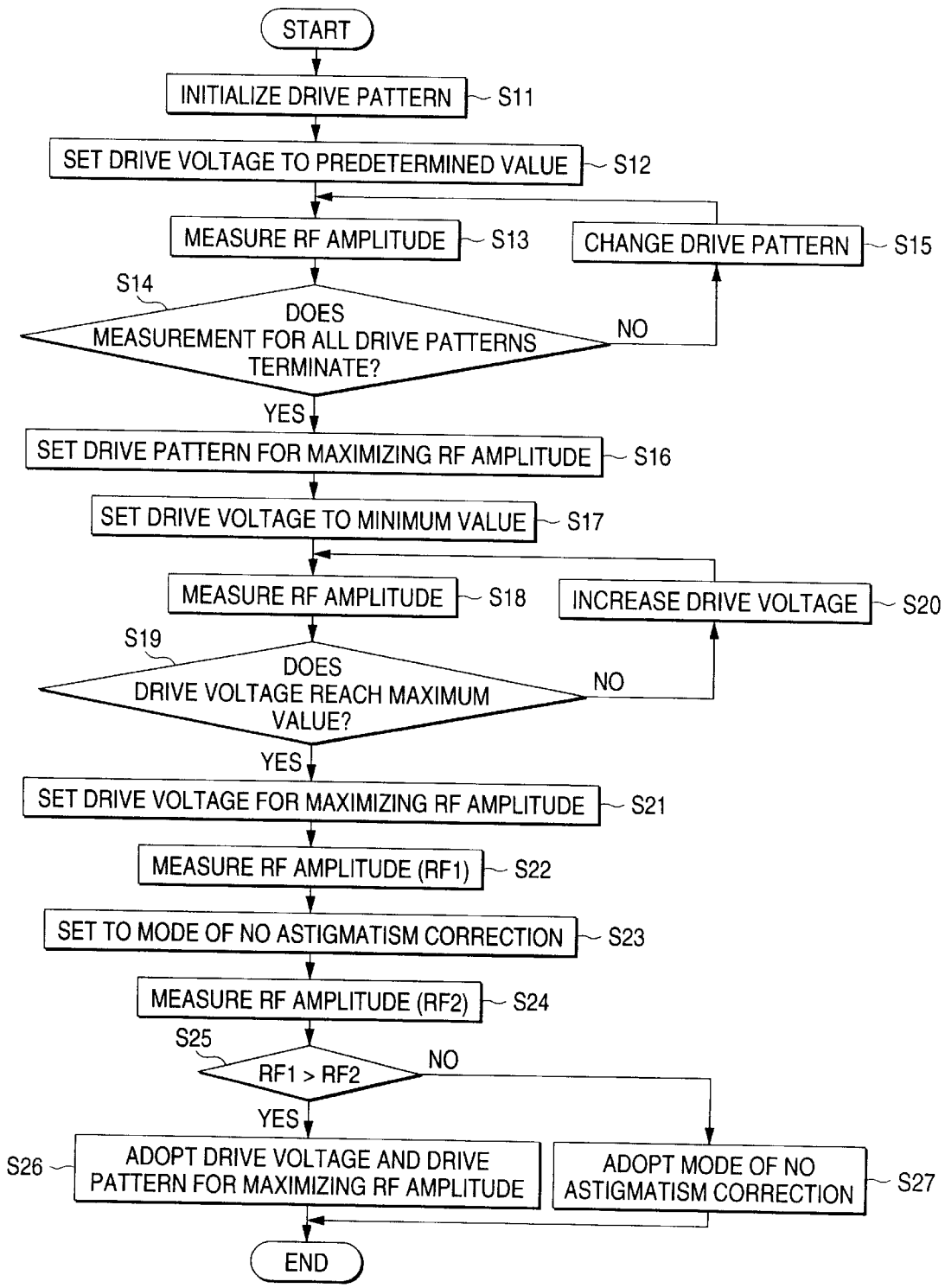
FIG. 17 is a flowchart to show an adjustment method of the liquid crystal panel for first determining a drive pattern and then drive voltage in the second embodiment of the invention.

Next, FIG. 17 is a flowchart to show an example of an adjustment method for shortening the processing time as compared with the processing in FIG. 16. The processing shown in FIG. 17 may be performed at the last stage of manufacturing or at the product power on time. In addition, if the processing is performed comparatively frequently, for example, at predetermined time intervals or at the replacement time of the optical disc 10, it is useful processing because adjustment can be made in a short time.

When the processing shown in FIG. 17 is started, the drive pattern is initialized at step S11. If the liquid crystal panel 3 is driven in the order of the drive patterns A to H as described above, the drive pattern A for first driving the liquid crystal panel 3 is set.

At step S12, an appropriate drive voltage for determining the drive pattern is set. That is, in the processing in FIG. 17, one drive pattern is determined before the drive voltage is determined, thus when the drive pattern is determined, the drive voltage is set to a temporarily determined value and measurement is executed. At this time, if the temporarily determined drive voltage value is too large, the wave front aberration amount corrected for a specific drive pattern becomes too large and it is feared that an out-of-tracking or out-of-focus phenomenon may occur. On the other hand, if the drive voltage value is too small, it is not preferred because S/N degradation, etc., at the measurement time is incurred. It is desirable to set the temporarily determined drive voltage value almost to the middle in the variable range of the drive voltage.

At step S13, the liquid crystal panel 3 is actually driven according to the setup drive pattern and the temporarily determined drive voltage and the amplitude of an RF signal detected by the light receiver 7 is measured. That is, if astigmatism is not corrected, the RF amplitude when the optical disc 10 is played back tends to lessen, and the RF amplitude is maximized by making an optimum correction of astigmatism. Thus, it is made possible to easily determine whether or not the astigmatism correction is proper by measuring the RF amplitude. The obtained RF amplitude measurement values may be temporarily stored in memory means (not shown) as in the case in FIG. 16.

At step S14, whether or not measurement for the eight drive patterns A to H is terminated is determined. If measurement for all eight drive patterns A to H is terminated (step S14, YES), control goes to step S16. On the other hand, if measuremet for a drive pattern is not terminated (step S14, NO), control goes to step S15 and the drive pattern corresponding to the next astigmatism angle is set, then control returns to step S13.

At step S16, an optimum drive pattern is selected and set as the result of the processing of steps S13 to S15. That is, the RF amplitude measurement values are read and one drive pattern for maximizing the RF amplitude is selected, and is once set for measurement for subsequent drive voltage determination.

At step S17, the drive voltage is set to the minimum value to execute measurement in order starting at the smallest value in the range of the drive voltages that can be set. In the embodiment, 16 steps of drive voltages can be set, for example.

At step S18, the liquid crystal panel 3 is actually driven according to the determined drive pattern and the setup drive voltage, the RF signal amplitude is measured as described above, and the measurement value is stored in the memory means. Also in this case, if optimum correction is made, the RF amplitude is maximized, so that it is made possible to easily determine whether or not the astigmatism correction is proper by measuring the RF amplitude.

At step S19, whether or not the drive voltage reaches the upper limit is determined. That is, whether or not processing to be performed for 16 steps of drive voltages is terminated is determined while holding the setting of the drive pattern. If the drive voltage reaches the upper limit (step S19, YES), control goes to step S21. On the other hand, if the drive voltage does not reach the upper limit (step S19, NO), control goes to step S20 and the drive voltage is increased and changed to the next step of drive voltage, then control returns to step S18.

At step S21, the RF amplitude measurement values provided as the result of processing of steps S17 to S20 are read and the drive voltage corresponding to the maximum RF amplitude measurement value is determined and set, whereby an optimum drive pattern and drive voltage combination for correcting astigmatism is set for the liquid crystal panel 3.

At step S22, the RF amplitude is again measured in the state in which the optimum combination is set and measurement value RF1 is obtained. This processing is performed for comparing with a case where no astigmatism correction is made.

At step S23, the drive pattern I is set as the case where no astigmatism correction is made. At step S24, RF amplitude measurement is executed in the state and measurement value RF2 is obtained. In this case, no phase difference is given to the light beam passing through the liquid crystal panel 3, and the measurement result reflecting the original astigmatism of the optical pickup itself is provided.

At step S25, the measurement value RF1 obtained at step S22 is compared with the measurement value RF2 obtained at step S24. If RF1>RF2 (step S25, YES), control goes to step S26; if RF1≦RF2 (step S25, NO), control goes to step S27.

At step S26, since larger RF amplitude is provided by making the astigmatism correction, the already found drive pattern and drive voltage are determined to be a combination used when the liquid crystal panel 3 is driven.

At step S27, since larger RF amplitude is provided by making no astigmatism correction, the corresponding drive pattern I is determined to be a drive pattern used when the liquid crystal panel 3 is driven.

After step S26 or S27, the liquid crystal panel 3 is driven by the determined drive method until another adjustment is made.

Figure 18:
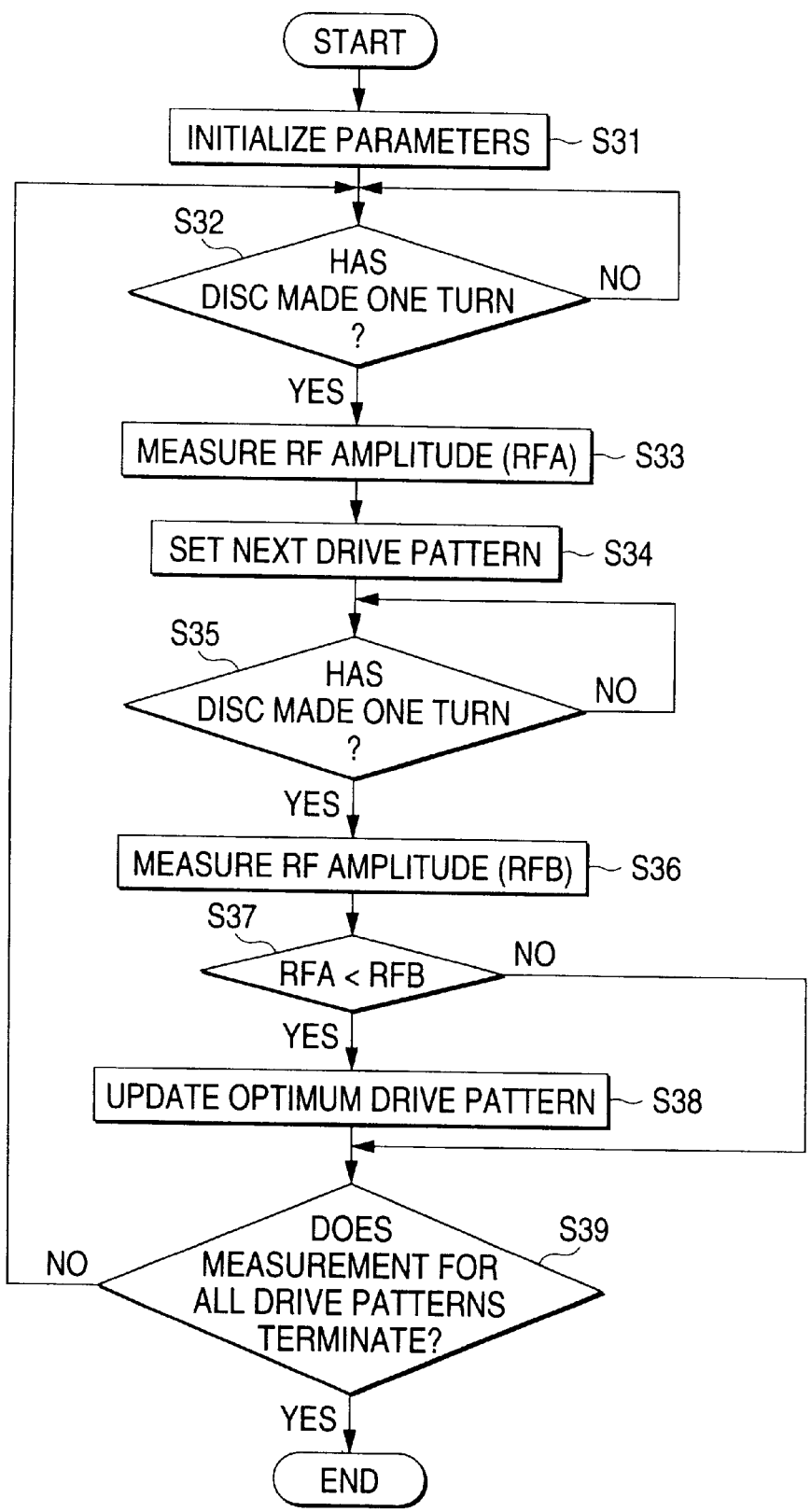
FIG. 18 is a flowchart to show drive pattern determination processing in the liquid crystal panel adjustment method executed in synchronization with rotation of an optical disc in the second embodiment of the invention.
Figure 19:
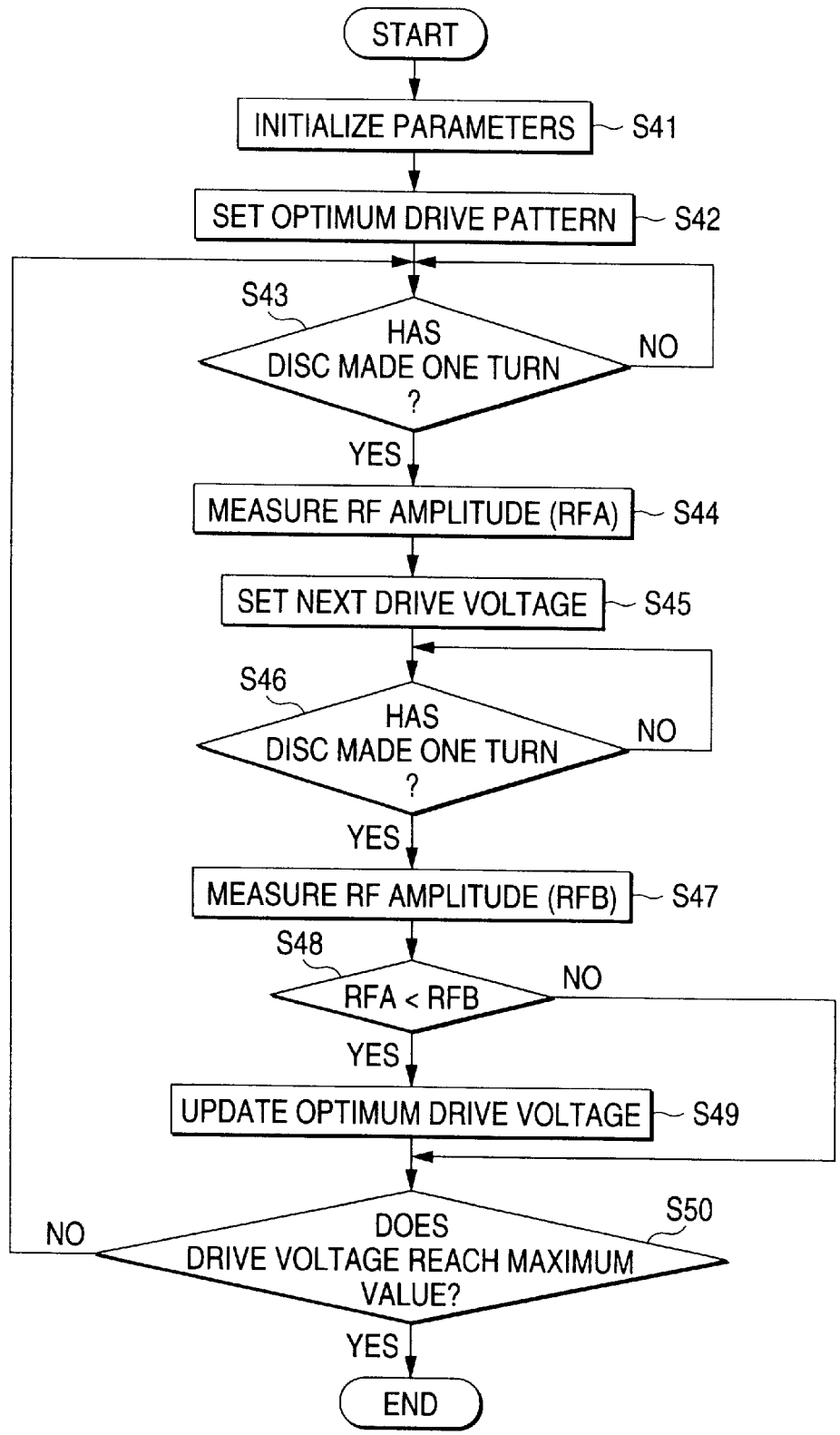
FIG. 19 is a flowchart to show drive voltage determination processing in the liquid crystal panel adjustment method executed in synchronization with rotation of an optical disc in the second embodiment of the invention.

Next, FIGS. 18 to 20 are flowcharts for executing the adjustment method in FIG. 17 considering RF amplitude fluctuation synchronized with rotation caused by side swing, etc., of the optical disc 10. That is, it is known that if the optical disc 10 is turned, side swing occurs because of the effect of tilt, etc., giving periodic variation to an RF signal in synchronization with the rotation. Resultantly, it may be unable to be distinguished from change in the RF amplitude measured by the adjustment method in FIG. 17 and there is a fear of hindering a precise correction for astigmatism. Then, to make a more precise astigmatism correction, it is effective to detect the RF amplitude in synchronization with rotation.

First, FIG. 18 is a flowchart to show drive pattern determination processing in the adjustment method synchronized with rotation of the optical disc 10. When the processing in FIG. 13 is started, various parameters are initialized at step S31.

Specifically, the drive pattern A is set and the optimum drive pattern indicating the drive pattern for giving the maximum RF amplitude is once set as the drive pattern A. A predetermined drive voltage preferred for determining drive pattern is set as in the case in FIG. 17.

At step S32, whether or not the optical disc 10 has made one turn is determined to perform processing in synchronization with rotation. To do this determination, rotation pulses output in conjunction with rotation of the spindle motor 9 may be read and a specific timing in the period of one turn may be identified.

If it is determined at step S32 that the optical disc 10 has made one turn (step S32, YES), control goes to step S33; if it is not determined that the optical disc 10 has made one turn (step S32, NO), step S32 is repeated, waiting for the optical disc 10 to make one turn.

At step S33, the liquid crystal panel 3 is actually driven according to the setup drive pattern and drive voltage, the RF amplitude is measured, and measurement value RFA is stored in the memory means.

At step S34, the drive pattern is changed to the drive pattern corresponding to the next astigmatism angle. At step S35, whether or not the optical disc 10 has made one turn is determined as at step S32. If it is determined that the optical disc 10 has made one turn (step S35, YES), control goes to step S36; if it is not determined that the optical disc 10 has made one turn (step S35, NO), step S35 is repeated, waiting for the optical disc 10 to make one turn.

At step S36, the liquid crystal panel 3 is actually driven according to the new drive pattern set at step S34 and the setup drive voltage, the RF amplitude is measured, and measurement value RFB is stored in the memory means.

At step S37, the measurement value RFA obtained at step S33 is compared with the measurement value RFB obtained at step S36. If RFA<RFB (step S37, YES), control goes to step S38; if RFA≧RFB (step S37, NO), control goes to step S39.

At step S38, since the later setup drive pattern provides larger RF amplitude as the result of the comparison at step S37, it is adopted as a new optimum drive pattern. In other words, the astigmatism direction is not yet found within the measurement range to the stage.

At step S39, whether or not measurement for the eight drive patterns A to H is terminated is determined. If measurement for all eight drive patterns A to H is terminated (step S39, YES), the processing is terminated. If measurement for a drive pattern is not terminated (step S39, NO), control returns to step S32 and similar processing is repeated.

Steps S31 to S39 are executed, whereby the optimum drive pattern for maximizing the RF amplitude in the state synchronized with rotation of the optical disc 10 is determined.

Next, FIG. 19 is a flowchart to show drive voltage determination processing in the adjustment method synchronized with rotation of the optical disc 10. When the processing in FIG. 19 is started, various parameters are initialized at step S41. Specifically, the minimum drive voltage is set and the optimum drive voltage indicating the drive voltage for giving the maximum RF amplitude is once set as the minimum drive voltage.

At step S42, the optimum drive pattern determined as the result of processing of steps S31 to S39 is set for the liquid crystal panel 3, whereby the optimum drive voltage can be determined in the state corresponding to the astigmatism direction.

At step S43, whether or not the optical disc 10 has made one turn is determined as described above. If it is determined that the optical disc 10 has made one turn (step S43, YES), control goes to step S44; if it is not determined that the optical disc 10 has made one turn (step S43, NO), step S43 is repeated, waiting for the optical disc 10 to make one turn.

At step S44, the liquid crystal panel 3 is actually driven according to the optimum drive pattern and the setup drive voltage, the RF amplitude is measured, and measurement value RFA is stored in the memory means.

At step S45, the drive voltage is increased and changed to the next drive voltage. At step S46, whether or not the optical disc 10 has made one turn is determined as at step S43. If it is determined that the optical disc 10 has made one turn (step S46, YES), control goes to step S47; if it is not determined that the optical disc 10 has made one turn (step S46, NO), step S46 is repeated, waiting for the optical disc 10 to make one turn.

At step S47, the liquid crystal panel 3 is actually driven according to the new drive voltage set at step S45 and the same drive pattern as at step S44, the RF amplitude is measured, and measurement value RFB is stored in the memory means.

At step S48, the measurement value RFA obtained at step S44 is compared with the measurement value RFB obtained at step S47. If RFA<RFB (step S48, YES), control goes to step S49; if RFA≧RFB (step S48, NO), control goes to step S50.

At step S49, since the later setup drive voltage provides larger RF amplitude as the result of the comparison at step S48, it is adopted as a new optimum drive voltage.

At step S50, whether or not the drive voltage reaches the upper limit is determined. If measurement for the 16 steps of drive voltages terminates and the drive voltage reaches the upper limit (step S50, YES), the processing is terminated. If the drive voltage does not yet reach the upper limit (step S50, NO), control returns to step S43 and similar processing is repeated.

Steps S41 to S50 are executed, whereby the optimum drive voltage for maximizing the RF amplitude in the state synchronized with rotation of the optical disc 10 is determined.

Next, FIG. 20 is a flowchart to show processing for comparing the optimum drive method determined as the result of processing in FIGS. 18 and 19 with the case where no astigmatism correction is made and determining whether or not astigmatism correction is proper. Also in this case, rotation of the optical disc 10 is considered for processing.

When the processing in FIG. 20 is started, at step S51, the optimum drive pattern determined as the result of processing of steps S31 to S39 is set. At step S52, the optimum drive voltage determined as the result of processing of steps S41 to S50 is set. Thus, the liquid crystal panel 3 is driven by the liquid crystal panel control section 8 in the state maximizing the RF amplitude.

At step S53, whether or not the optical disc 10 has made one turn is determined. If it is determined that the optical disc 10 has made one turn (step S53, YES), control goes to step S54; if it is not determined that the optical disc 10 has made one turn (step S53, NO), step S53 is repeated, waiting for the optical disc 10 to make one turn.

At step S54, the liquid crystal panel 3 is actually driven according to the optimum drive pattern and the optimum drive voltage, the RF amplitude is measured, and measurement value RFA is obtained.

At step S55, the drive pattern I is set as the case where no astigmatism correction is made. That is, the setting corresponds to the state in which no phase difference is given to the light beam passing through the liquid crystal panel 3.

At step S56, whether or not the optical disc 10 has made one turn is determined as at step S53. If it is determined that the optical disc 10 has made one turn (step S56, YES), control goes to step S57; if it is not determined that the optical disc 10 has made one turn (step S56, NO), step S56 is repeated, waiting for the optical disc 10 to make one turn.

At step S57, RF amplitude measurement is executed in the state in which no astigmatism correction is made, and measurement value RFB is obtained, whereby the measurement result reflecting the original astigmatism of the optical pickup intact is provided.

At step S58, the measurement value RFA obtained at step S54 is compared with the measurement value RFB obtained at step S57. If RFA>RFB (step S58, YES), control goes to step S59; if RFA≦RFB (step S58, NO), control goes to step S60.

At step S59, since larger RF amplitude is provided by making the astigmatism correction, the optimum drive pattern and the optimum drive voltage are determined to be a combination used when the liquid crystal panel 3 is driven.

At step S60, since larger RF amplitude is provided by making no astigmatism correction, the corresponding drive pattern I is determined to be a drive pattern used when the liquid crystal panel 3 is driven.

After step S59 or S60, the liquid crystal panel 3 is driven by the determined drive method until another adjustment is made.

Steps S51 to S60 are executed, whereby an astigmatism correction with the liquid crystal panel 3 is suppressed for an optical system originally containing little astigmatism, so that a more appropriate adjustment method can be realized.

In the described first and second embodiments, the outer peripheral portion of the transparent electrode 22A of the liquid crystal panel 3 is divided into four and eight parts, but may be divided into any number of parts for providing pattern electrodes, such as 16 parts. In this case, if it is divided into a larger number of parts, it is made possible to correct astigmatism with higher accuracy, but the structure and control become complicated and it takes time in adjustment. Therefore, the number of divisions needs to be determined in a proper range.

In the described embodiments, to decrease the effect of temperature change, a temperature sensor may be provided for correcting the drive voltage in response to temperature output of the temperature sensor, whereby it is made possible to drive the liquid crystal panel 3 in a wide temperature range.

In addition, in the described embodiments, Liquid crystal is used as the material whose refractive index changes by voltage application, but the material is not limited to the liquid crystal and an electro-optic material, such as $LiNbO_3$, may be used.

According to the invention, a phase difference is given to a passing-through luminous flux, thereby correcting astigmatism, so that the astigmatism effect can be corrected easily and a good play-back characteristic can be provided.

The present disclosure relates to the subject matter contained in Japanese patent applications No. Hei. 10-80305 filed on Mar. 12, 1998 and No. Hei. 10-203952 filed on Jul. 7, 1998, which are expressly incorporated herein by reference in its entirety.

While only certain embodiments of the invention have been specifically described herein, it will apparent that numerous modifications may be made thereto without departing from the spirit and scope of the invention.

What is claimed is:

1. An optical pickup comprising:
   a light source for emitting a light beam;
   an object lens for processing the light beam from the light source; and
   aberration correction means for correcting aberration by giving a phase difference to the light beam, said aberration correction means correcting astigmatism caused by an optical system of said optical pickup, said aberration correction means having an area substantially corresponding to a wave front aberration distribution of the astigmatism, optical properties of the area being changed so as to cancel the astigmatism.

2. The optical pickup as claimed in claim 1, wherein said aberration correction means is divided into a plurality of parts having an overall pattern substantially corresponding to the wave front aberration distribution of the astigmatism, each of the plurality of parts in said aberration correction means including a division electrode for receiving a voltage and a refractive index variable layer whose refractive index with respect to the light beam changes in response to a change in the voltage, and wherein a phase difference for canceling the astigmatism is given to the light beam through division electrodes by controlling the voltages.

3. The optical pickup as claimed in claim 2, wherein said refractive index variable layer is a liquid crystal layer.

4. The optical pickup as claimed in claim 1, wherein said aberration correction means is divided into a plurality of parts having an overall pattern substantially corresponding to the wave front aberration distribution of the astigmatism.

5. The optical pickup as claimed in claim 4, wherein each of the plurality of parts in said aberration correction means includes a division electrode, and voltages are applied to the division electrodes so as to give the phase difference for canceling the astigmatism to the light beam.

6. The optical pickup as claimed in claim 1, wherein the wave front aberration distribution is based on a pupil plane of said object lens.

7. An aberration correction unit for giving a phase difference to a light beam emitted from a light source and applied through an object lens to a recording medium, thereby correcting aberration, said aberration correction unit comprising:
   an electrode including a plurality of division electrodes corresponding to a plurality of division areas through which the light beam passes and which are divided in accordance with a distribution of astigmatism caused by an optical system,
   wherein a voltage is applied to each division electrode provided in each division area in response to directionality of the astigmatism so that a phase difference is given to the light beam passing through each division area in response to change in the voltage for correcting the astigmatism.

8. The aberration correction unit as claimed in claim 7, wherein the astigmatism is corrected by giving the phase difference to the light beam through a liquid crystal layer having a refractive index varied in response to the voltage.

9. The aberration correction unit as claimed in claim 8, further comprising:
   detection means for detecting a direction and size of the astigmatism,
   wherein the voltage is set based on the detection result of said detection means.

10. The aberration correction unit as claimed in claim 9, wherein said detection means detects the direction and size of the astigmatism at the last stage of manufacturing or at the power on time of the product.

11. The aberration correction unit as claimed in claim 8, wherein the voltages applied to the division electrodes can be set separately for each division area.

12. The aberration correction unit as claimed in claim 8, wherein said division areas are divided into a center portion and an outer peripheral portion, the outer peripheral portion being substantially symmetrically divided with respect to the center portion.

13. The aberration correction unit as claimed in claim 12, wherein voltages for giving phase differences to the light beam are applied to a pair of division electrodes of the outer peripheral portion symmetrical with respect to the center portion corresponding to the astigmatism direction and a pair of division electrodes of the outer peripheral portion orthogonal thereto, and wherein the voltage applied to the pair of division electrodes has the phase differences of opposite polarities with respect to the voltage applied to the pair of orthogonal division electrodes.

14. The aberration correction unit as claimed in claim 12, wherein if the astigmatism direction is positioned in the vicinity of a boundary between the division areas of the outer peripheral portion, voltages for giving phase differences to the light beam are applied to two pairs of division electrodes arranged symmetrical with respect to the center portion on both sides of the boundary and two pairs of division electrodes orthogonal thereto, and the voltage applied to the two pairs of division electrodes has the phase differences of opposite polarities with respect to the voltage applied to the two pairs of orthogonal division electrodes.

15. The aberration correction unit as claimed in claim 12, wherein the correction degree of the astigmatism is determined at a predetermined timing for M×N setting states provided by combining M drive patterns of the division areas corresponding to the astigmatism direction and N steps of voltages applied to the electrodes, and an optimum setting state is selected for correcting the astigmatism.

16. The aberration correction unit as claimed in claim 15, wherein the astigmatism in the optimum setting state for the astigmatism correction is compared with that in a state in which the astigmatism correction is not made and wherein the astigmatism correction is made only if better astigmatism is provided in the optimum setting state.

17. The aberration correction unit as claimed in claim 15, wherein the correction degree of the astigmatism is determined in synchronization with a rotation period of the turned recording medium.

18. The aberration correction unit as claimed in claim 12, wherein the correction degree of the astigmatism is determined on preset voltage at a predetermined timing for M drive patterns of the division areas corresponding to the astigmatism direction and an optimum drive pattern is selected, then the correction degree of the astigmatism is furthermore determined for N steps of voltages applied to the electrodes and an optimum voltage is selected for correcting the astigmatism.

19. The aberration correction unit as claimed in claim 18, wherein the astigmatism in the optimum setting state for the astigmatism correction is compared with that in a state in which the astigmatism correction is not made and wherein the astigmatism correction is made only if better astigmatism is provided in the optimum setting state.

20. The aberration correction unit as claimed in claim 18, wherein the correction degree of the astigmatism is determined in synchronization with a rotation period of the turned recording medium.

21. An optical pickup comprising:

an aberration correction unit as claimed in claim 7; and an optical system placed such that the light beam emitted from the light source and applied to a recording medium passes through said aberration correction unit.

22. An astigmatism detection method, for an aberration correction unit in which an area through which a light beam emitted from a light source and applied through an object lens to a recording medium passes is divided into a plurality of division areas corresponding to a distribution of astigmatism caused by an optical system, and an electrode to which a voltage is applied is provided in each division area, said astigmatism detection method comprising the steps of:

adjusting a drive pattern of the division areas and the voltage applied to each electrode; and detecting a direction and size of the astigmatism.

23. A aberration correction method comprising the steps of:

preparing an electrode through which a light beam passes, said electrode including a plurality of division electrodes;

applying voltage to said division electrodes in accordance with a distribution of astigmatism so as to give a phase difference to the light beam, to thereby correct the astigmatism.

24. The aberration correction method according to claim 23, wherein the voltage is applied to said division electrodes in accordance with directionality of astigmatism.

25. The aberration correction method according to claim 24, further comprising the steps of:

preparing a plurality of drive patterns, each of which a voltage signal applied to each of said division electrodes is preset, and a plurality of steps of voltage to be applied corresponding to said voltage signal, measuring correction degree of the astigmatism, so as to determine the optimum drive pattern and the optimum voltage for correcting the astigmatism.

26. The aberration correction method according to claim 25, wherein said measuring step is conducted in synchronization with a rotation period of a recording medium.

27. The aberration correction method according to claim 24, further comprising the step of:

detecting the directionality and size of the astigmatism.

28. An optical pickup comprising:

a light source for emitting a light beam;

an object lens for processing the light beam from the light source; and an aberration correction unit correcting aberration by giving a phase difference to the light beam, said aberration correction unit correcting astigmatism caused by an optical system of said optical pickup, said aberration correction unit having an area substantially corresponding to a wave front aberration distribution of the astigmatism, optical properties of the area being changed so as to cancel the astigmatism.

\* \* \* \* \*